United States Patent
Yang et al.

(10) Patent No.: US 12,267,866 B2
(45) Date of Patent: Apr. 1, 2025

(54) CHANNEL ACCESS METHOD AND RELATED PRODUCT

(71) Applicant: HUAWEI TECHNOLOGIES CO., LTD., Guangdong (CN)

(72) Inventors: Mao Yang, Xi'an (CN); Zhongjiang Yan, Xi'an (CN); Jian Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 482 days.

(21) Appl. No.: 17/860,982

(22) Filed: Jul. 8, 2022

(65) Prior Publication Data

US 2022/0346148 A1    Oct. 27, 2022

Related U.S. Application Data

(63) Continuation of application No. PCT/CN2021/070954, filed on Jan. 8, 2021.

(30) Foreign Application Priority Data

Jan. 10, 2020   (CN) .......................... 202010030439.4

(51) Int. Cl.
*H04W 74/0816*   (2024.01)
(52) U.S. Cl.
CPC .............................. *H04W 74/0816* (2013.01)
(58) Field of Classification Search
CPC ......... H04W 74/0816; H04W 74/0808; H04W 74/002; H04W 74/08; H04B 7/0691; H04L 5/00
See application file for complete search history.

(56) References Cited

U.S. PATENT DOCUMENTS

| | | | |
|---|---|---|---|
| 10,257,860 B2 | 4/2019 | Si et al. | |
| 2019/0380064 A1 | 12/2019 | Salem et al. | |
| 2021/0345410 A1* | 11/2021 | Zhou | H04W 74/004 |

FOREIGN PATENT DOCUMENTS

| | | |
|---|---|---|
| CN | 110166182 A | 8/2019 |
| WO | 2019031806 A1 | 2/2019 |

OTHER PUBLICATIONS

IEEE Std 802.Nov. 2016, "IEEE Standard for Information Technology-Telecommunications and Information Exchange Between Systems Local and Metropolitan Area Networks-Specific Requirements, Part 11: Wireless LAN Medium Access Control (MAC) and Physical Layer (PHY) Specifications," Dec. 7, 2016, 3534 pages.

EEE P802.11ax/D6.0, "Draft Standard for Information Technology-Tele-Communications and Information Exchange Between Systems Local and Metropolitan Area Networks-Specific Requirements, Part 11: Wireless LAN Medium Access Control (MAC) and Physical Layer (PHY) Specifications," Nov. 2019, 780 pages.

International Search Report and Written Opinion in International Appln. No. PCT/CN2021/070954, mailed on Apr. 14, 2021, 17 pages (with English translation).

* cited by examiner

*Primary Examiner* — Kyaw Z Soe
(74) *Attorney, Agent, or Firm* — Fish & Richardson P.C.

(57) ABSTRACT

Embodiments of this application disclose a channel access method and a related product. The method is applied to a network device. The network device includes a plurality of panels. An example method includes: generating a backoff count value of each of the plurality of panels; and if a backoff count value of any one of the plurality of panels backs off to zero, sending a frame.

20 Claims, 17 Drawing Sheets

CHANNEL ACCESS METHOD AND RELATED PRODUCT

CROSS-REFERENCE TO RELATED APPLICATIONS

This application is a continuation of International Application No. PCT/CN2021/070954, filed on Jan. 8, 2021, which claims priority to Chinese Patent Application No. 202010030439.4, filed on Jan. 10, 2020. The disclosures of the aforementioned applications are hereby incorporated by reference in their entireties.

TECHNICAL FIELD

The present invention relates to the field of communication technologies, and in particular, to a channel access method and a related product.

BACKGROUND

The IEEE 802.11 working group is having a discussion on the successor of IEEE 802.11ax, extremely high throughput (Extremely High Throughput, EHT) (802.11be). More spatial flows (for example, 9 to 16 spatial flows) are considered to be introduced into a next generation wireless local area network (Wireless Local Area Network, WLAN). The spatial flows refer to that a network device sends a plurality of wireless signals at the same time, and each signal is one spatial flow. EHT expects to increase throughput of network devices by increasing spatial flows. However, due to device capability limitation, it is usually difficult for a single access point (Access Point, AP) to provide 16 spatial flows.

A multi-panel multiple-input multiple-output (Multi-Panel MIMO, MP MIMO) technology refers to that a network device (for example, a base station in a cellular network) includes a plurality of panels that are interconnected, and each panel is equipped with one or more transceiver antennas. Antenna resources of a network device are distributed to a plurality of panels that are close to or remote from each other. Therefore, after the MP MIMO technology is used, costs and complexity of deploying a plurality of the antennas of the network device are reduced, scalability, coverage capability, and a channel gain of MIMO of the network device are improved, and spatial flows of the network device are further increased. Therefore, the MP MIMO technology provides a feasible solution to using more spatial flows or antenna resources in the next generation WLAN.

In addition, to improve coverage areas and spatial diversity gains of the plurality of panels of the network device, the plurality of panels are usually disposed in different geographical locations. As a result, channel states sensed by the plurality of panels are different. However, if the plurality of panels sense the different channel states, how the network device uses the plurality of panels to access a channel is currently still unknown.

SUMMARY

This application provides a channel access method and a related product, so that a multi-panel device can successfully access a channel.

According to a first aspect, embodiments of this application provide a network device. The network device includes a processing unit and a transceiver unit, and the transceiver unit includes a plurality of panels.

The processing unit is configured to generate a backoff count value of each of the plurality of panels.

The transceiver unit is configured to send a frame if a backoff count value of any one of the plurality of panels backs off to zero.

It can be learned that one backoff count value is generated for each of the plurality of panels of the network device, so that each panel independently performs backoff. If the backoff count value of the any one of the panels backs off to zero, it is determined that the network device obtains permission to use a channel. In this case, the network device may send the frame, to successfully access the channel when the plurality of panels sense different channel states. Because the network device successfully accesses the channel, the network device (multi-panel device) may be used to send the frame, thereby increasing a spatial flow, improving a throughput during information transmission, and further improving information transmission efficiency.

In a possible implementation, the transceiver unit is configured to send a frame through a first panel, and the first panel is a panel whose backoff count value is zero in the plurality of panels.

The processing unit is further configured to suspend a backoff process of each panel in all panels except the first panel in the plurality of panels, and retain a backoff count value and a contention window of each panel.

It can be learned that one backoff count value is generated for each of the plurality of panels of the network device, so that each panel independently performs backoff. If the backoff count value of the any one of the panels backs off to zero, a backoff process of another panel is suspended, and a backoff count value of the another panel is retained. Because the backoff process of the another panel has been maintained, after sending the frame, the network device resumes the backoff process maintained for the another panel. Resuming the previous backoff process by the network device for the another panel increases a probability that the network device re-obtains permission to use a channel.

In a possible implementation, the transceiver unit is configured to send the frame through the first panel, and the first panel is the panel whose backoff count value is zero in the plurality of panels.

The processing unit is further configured to suspend a backoff process of each panel in all panels except the first panel in the plurality of panels, reset a backoff count value of each panel, and retain or reset a contention window of each panel.

It can be learned that, if the backoff count value of the any one of the panels backs off to zero, the backoff process of the another panel is suspended, and the backoff count value of the another panel is reset, so that after the network device sends the frame, the network device re-contends for permission to use the network. Therefore, this ensures fairness of contending for permission to use the channel by another network device (for example, a single-panel device).

In a possible implementation, the transceiver unit is configured to send a frame through a first panel and/or a candidate panel. The first panel is a panel whose backoff count value is zero in the plurality of panels. The candidate panel is one or more panels that meet a preset condition in all panels except the first panel in the plurality of panels. The preset condition is detecting, through a panel, that a channel remains idle within a preset time period. The preset time period is a time period before a time point at which the backoff count value of the first panel backs off to zero.

The processing unit is further configured to: if the frame is sent through the first panel, suspend a backoff process of each panel in all panels except the first panel in the plurality of panels, and retain a backoff count value and a contention window of each panel; or if the frame is sent through the first panel and the candidate panel, or the frame is sent through the candidate panel, suspend a backoff process of each panel in all panels except the first panel and the candidate panel in the plurality of panels, and retain a backoff count value and a contention window of each panel.

Alternatively, the transceiver unit is configured to send the frame through the first panel if no panel meets the preset condition in all panels except the first panel in the plurality of panels.

The processing unit is further configured to suspend a backoff process of each panel in all panels except the first panel in the plurality of panels, and retain a backoff count value and a contention window of each panel.

It can be learned that, if the backoff count value of the any one of the panels backs off to zero, it is determined that the network device obtains permission to use the channel, and searches for the candidate panel that meets the preset condition from other panels, to send the frame through the first panel and the candidate panel, thereby facilitating reuse of panels in space. Because the plurality of panels may be used to send the frame, efficiency of information transmission is improved. For a panel whose backoff count value is not zero and does not meet the preset condition, a backoff process maintained for the panel is suspended, and the backoff count value is retained. Because the backoff process has been maintained for the panel, after sending the frame, the network device resumes the backoff process maintained for the panel. Resuming the previous backoff process by the network device for the panel increases a probability that the network device re-obtains permission to use the channel.

In a possible implementation, the transceiver unit is configured to send a frame through a first panel and/or a candidate panel. The first panel is a panel whose backoff count value is zero in the plurality of panels. The candidate panel is one or more panels that meet a preset condition in all panels except the first panel in the plurality of panels. The preset condition is detecting, through a panel, that a channel remains idle within a preset time period. The preset time period is a time period before a time point at which the backoff count value of the first panel backs off to zero; and the processing unit is further configured to: suspend a backoff process of each panel in all panels except the first panel in the plurality of panels, reset a backoff count value of each panel, and retain or reset a contention window of each panel; or suspend a backoff process of each panel in all panels except the first panel and the candidate panel in the plurality of panels, reset the backoff count value and the contention window of each panel, and retain or reset the contention window of each panel;

Alternatively, the transceiver unit is configured to send the frame through the first panel if no panel meets the preset condition in all panels except the first panel in the plurality of panels.

The processing unit is further configured to suspend a backoff process of each panel in all panels except the first panel in the plurality of panels, reset a backoff count value of each panel, and retain or reset a contention window of each panel.

It can be learned that, if the backoff count value of the any panel backs off to zero, it is determined that the network device obtains permission to use the channel, and searches for the candidate panel that meets the preset condition from other panels, to send the frame through the first panel and the candidate panel, thereby facilitating spatial reuse of panels.

Because the plurality of panels may be used to send the frame, efficiency of information transmission is further improved. For a panel whose backoff count value backs off to zero and does not meet the preset condition, the network device suspends a backoff process for the panel, and resets the backoff count value of the panel, so that after the network device sends the frame, the network device re-contends for permission to use the channel. Therefore, this ensures fairness of contending for permission to use the channel by another network device (for example, a single-panel device).

In a possible implementation, the processing unit is further configured to: if the backoff count value of the any one of the plurality of panels is not zero and when detecting, through the panel, that a channel is idle in a current slot, subtract one from the backoff count value of the panel, and when detecting, through the panel, that the channel is busy in the current slot, suspend a backoff process of the panel and retain a backoff count value and a contention window of the panel.

It can be learned that if the backoff count value of the any one of the plurality of panels is not zero, it indicates that the network device does not obtain permission to use the channel. In this case, the backoff process of each panel is suspended, and the backoff count value of each panel is processed based on a channel state in the current slot. To be specific, the network device is enabled to normally perform backoff, so that the network device can contend with another network device for permission to use the channel.

According to a second aspect, embodiments of this application provide a network device. The network device includes a processing unit and a transceiver unit, and the transceiver unit includes a plurality of panels.

The processing unit is configured to generate a backoff count value.

The transceiver unit is configured to send a frame if the backoff count value backs off to zero.

It can be learned that one backoff counter is set for the plurality of panels of the network device, and if the network device contends for permission to use a channel, one backoff process is maintained for the plurality of panels. If the backoff count value backs off to zero, it is determined that the network device obtains permission to use the channel. In this case, the network device may access the channel, so that the network device can successfully access the channel when the plurality of panels sense different channel states. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

In a possible implementation, the processing unit is further configured to: before generating the backoff count value, detect, through a first panel, whether the channel is idle, where the first panel is a panel corresponding to the backoff count value in the plurality of panels.

It can be learned that whether the channel is idle is detected through only one panel. Therefore, efficiency of determining a channel state is improved, and maintenance efficiency in a backoff process is further improved.

In a possible implementation, the transceiver unit is configured to send a frame through the first panel and/or a candidate panel. The candidate panel is one or more panels that meet a preset condition in all panels except the first panel in the plurality of panels. The preset condition is detecting, through the panel, that a channel remains idle within a preset time period. The preset time period is a time period before a time point at which the backoff count value of the first panel backs off to zero.

It can be learned that, after the first panel of the network device obtains permission to use the channel, another panel is further searched for a candidate panel that meets the preset condition, thereby facilitating spatial reuse of the panel. Because the plurality of panels may be used to send the frame, efficiency of information transmission is further improved.

In a possible implementation, the processing unit is further configured to: before generating the backoff count value, detect the channel through each of the plurality of panels; and determine, based on listening results of some or all of the plurality of panels, whether the channel is idle.

It can be learned that a channel is detected by using the plurality of panels, so that accuracy of determining a channel state is improved. Therefore, a backoff process more conforms to an actual state of the channel, and a case of incorrectly maintaining the backoff process is avoided.

In a possible implementation, the processing unit is configured to send the frame through the candidate panel, where the candidate panel is one or more panels that meet the preset condition in the plurality of panels. The preset condition is detecting, through the panel, that a channel remains idle within the preset time period, and the preset time period is the time period before the time point at which the backoff count value backs off to zero.

It can be learned that when the backoff count value of the first panel backs off to zero, the channel state is determined by using the listening results of the plurality of panels. Therefore, to consider an actual listening result of the channel by the first panel, whether the first panel meets the preset condition is further determined, to avoid a problem of a transmission conflict and a transmission failure caused by a false determination that the first panel obtains permission to use the channel. In addition, a candidate panel that meets the preset condition is further searched from another panel except the first panel, to facilitate spatial reuse of the panel. Because the plurality of panels may be used to send the frame, efficiency of information transmission is further improved.

In a possible implementation, the processing unit is further configured to: if the backoff count value is not zero and when detecting that the channel is idle in a current slot, subtract one from the backoff count value, and when detecting that the channel is busy in the current slot, suspend a backoff process of the first panel and retain a backoff count value and a contention window of the first panel. The first panel is a panel corresponding to the backoff count value in the plurality of panels.

It can be learned that if the backoff count value is not zero, it indicates that the network device does not obtain permission to use the channel. In this case, the network suspends the backoff process of the first panel, and processes the backoff count value of the first panel based on the channel state in the current slot. To be specific, the network device normally performs backoff, so that the network device can contend with another network device for permission to use the channel.

According to a third aspect, embodiments of this application provide a channel access method, applied to a network device, where the network device includes a plurality of panels. The method includes:

generating a backoff count value for each of the plurality of panels; and sending a frame if a backoff count value of any one of the plurality of panels backs off to zero.

It can be learned that one backoff count value is generated for each of the plurality of panels of the network device, so that each panel independently performs backoff. If a backoff count value of any panel backs off to zero, it is determined that the network device obtains permission to use a channel. In this case, the network device may send the frame, to successfully access the channel when the plurality of panels sense different channel states. Because the network device successfully accesses the channel, the network device (multi-panel device) may be used to send the frame, thereby increasing a spatial flow, improving a throughput during information transmission, and further improving information transmission efficiency.

In a possible implementation, the sending a frame includes:

sending a frame through a first panel, where the first panel is a panel whose backoff count value is zero in the plurality of panels.

The method further includes:

suspending a backoff process of each panel in all panels except the first panel in the plurality of panels, and retaining a backoff count value and a contention window of each panel.

It can be learned that one backoff count value is generated for each of the plurality of panels of the network device, so that each panel independently performs backoff. If the backoff count value of the any panel backs off to zero, a backoff process of another panel is suspended, and a backoff count value of the another panel is retained. Because the backoff process of the another panel has been maintained, after sending the frame, the network device resumes the backoff process maintained for the another panel. For the another panel, the network continues to back off following the previous backoff process, thereby increasing a probability that the network device re-obtains permission to use a channel.

In a possible implementation, the sending a frame includes:

sending a frame through the first panel, where the first panel is the panel whose backoff count value is zero in the plurality of panels.

The method further includes:

suspending the backoff process of each panel in all panels except the first panel in the plurality of panels, resetting the backoff count value of each panel, and retaining or resetting the contention window of each panel.

It can be learned that, if the backoff count value of the any panel backs off to zero, the backoff process of the another panel is suspended, and the backoff count value of the another panel is reset, so that after the network device sends the frame, the network device re-contends for permission to use the network. Therefore, fairness of contending for permission to use the channel by another network device (for example, a single-panel device) is ensured.

In a possible implementation, the sending a frame includes:

sending a frame through a first panel and/or a candidate panel, where the first panel is a panel whose backoff count value is zero in the plurality of panels, the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero.

The method further includes:

if the frame is sent through the first panel, suspending a backoff process of each panel in all panels except the first panel in the plurality of panels, and retaining a backoff count value and a contention window of each panel; and if the frame is sent through the first panel and the candidate panel, or the frame is sent through the candidate panel, suspending a backoff process of each panel in all panels except the first panel and the candidate panel in the plurality of panels, and retaining a backoff count value and the contention window of each panel.

Alternatively, the sending a frame includes:

sending the frame through the first panel if no panel meets the preset condition in all panels except the first panel in the plurality of panels; and the method further includes:

suspending the backoff process of each panel in all panels except the first panel in the plurality of panels, and retaining the backoff count value and the contention window of each panel.

It can be learned that, if the backoff count value of the any panel backs off to zero, it is determined that the network device obtains permission to use the channel, and searches for the candidate panel that meets the preset condition from other panels, to send the frame through the first panel and the candidate panel, thereby facilitating spatial reuse of panels. Because the plurality of panels may be used to send the frame, efficiency of information transmission is improved. For a panel whose backoff count value is not zero and does not meet the preset condition, a backoff process maintained for the panel is suspended, and the backoff count value is retained. Because the backoff process has been maintained for the panel, after sending the frame, the network device resumes the backoff process maintained for the panel. Resuming the previous backoff process by the network device for the panel increases a probability that the network device re-obtains permission to use the channel.

In a possible implementation, the sending a frame includes:

sending a frame through a first panel and/or a candidate panel, where the first panel is a panel whose backoff count value is zero in the plurality of panels, the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero;

the method further includes:

if the frame is sent through the first panel, suspending a backoff process of each panel in all panels except the first panel in the plurality of panels, resetting a backoff count value of each panel, and retaining or resetting a contention window of each panel; and if the frame is sent through the first panel and the candidate panel, or the frame is sent through the candidate panel, suspending a backoff process of each panel in all panels except the first panel and the candidate panel in the plurality of panels, resetting the backoff count value of each panel, and retaining or resetting the contention window of each panel;

Alternatively, the sending a frame includes:

sending the frame through the first panel if no panel meets the preset condition in all panels except the first panel in the plurality of panels; and the method further includes:

suspending the backoff process of each panel in all panels except the first panel in the plurality of panels, resetting the backoff count value of each panel, and retaining or resetting the contention window of each panel.

It can be learned that, if the backoff count value of the any panel backs off to zero, it is determined that the network device obtains permission to use the channel, and searches for the candidate panel that meets the preset condition from other panels, to send the frame through the first panel and the candidate panel, thereby facilitating spatial reuse of panels. Because the plurality of panels may be used to send the frame, efficiency of information transmission is further improved. For a panel whose backoff count value backs off to zero and does not meet the preset condition, the network device suspends a backoff process for the panel, and resets the backoff count value of the panel, so that after the network device sends the frame, the network device re-contends for permission to use the channel. Therefore, fairness of contending for permission to use the channel by another network device (for example, a single-panel device) is ensured.

In a possible implementation, if the backoff count value of the any one of the plurality of panels is not zero and when detecting, through the panel, that a channel is idle in a current slot, one is subtracted from the backoff count value of the panel, and when detecting, through the panel, that the channel is busy in the current slot, a backoff process of the panel is suspended and a backoff count value and a contention window of the panel are retained.

It can be learned that if the backoff count value of the any one of the plurality of panels is not zero, it indicates that the network device does not obtain permission to use the channel. In this case, the backoff process of each panel is suspended, and the backoff count value of each panel is processed based on a channel state in the current slot. To be specific, the network device is enabled to normally perform backoff, so that the network device can contend with another network device for permission to use the channel.

According to a fourth aspect, embodiments of this application provide a channel access method, applied to a network device, where the network device includes a plurality of panels. The method includes:

generating a backoff count value; and if the backoff count value backs off to zero, sending a frame.

It can be learned that one backoff counter is set for the plurality of panels of the network device, and if the network device contends for permission to use a channel, one backoff process is maintained for the plurality of panels. If the backoff count value backs off to zero, it is determined that the network device obtains permission to use the channel. In this case, the network device may access the channel, so that the network device can successfully access the channel when the plurality of panels sense different channel states. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

In a possible implementation, before the generating a backoff count value, the method further includes:

listening to, through a first panel, whether a channel is idle, where the first panel is a panel corresponding to the backoff count value in the plurality of panels.

It can be learned that whether the channel is idle is detected through only one panel. Therefore, efficiency of determining a channel state is improved, and maintenance efficiency in a backoff process is further improved.

In a possible implementation, the sending a frame includes:

sending the frame through the first panel and/or a candidate panel, where the candidate panel is one or more panels that meet a preset condition in all panels except the first panel in the plurality of panels, the preset condition is detecting, through a panel, that the channel remains idle within a preset time period, and the preset time period is a time period before a time point at which the backoff count value of the first panel backs off to zero.

It can be learned that, after the first panel of the network device obtains permission to use the channel, another panel is further searched for a candidate panel that meets the preset condition, thereby facilitating spatial reuse of the panel. Because the plurality of panels may be used to send the frame, efficiency of information transmission is further improved.

In a possible implementation, before the generating a backoff count value, the method further includes:

listening to a channel through each of the plurality of panels; and determine, based on listening results of some or all of the plurality of panels, whether the channel is idle.

It can be learned that a channel is detected by using a plurality of panels, so that accuracy of determining a channel state is improved. Therefore, a backoff process more conforms to an actual state of the channel, and a case of incorrectly maintaining the backoff process is avoided.

In a possible implementation, the sending a frame includes:

sending the frame through a candidate panel, where the candidate panel is one or more panels that meet a preset condition in the plurality of panels. The preset condition is detecting, through a panel, that the channel remains idle within a preset time period. The preset time period is a time period before a time point at which the backoff count value backs off to zero.

It can be learned that when the backoff count value of the first panel backs off to zero, the channel state is determined by using the listening results of the plurality of panels. Therefore, to consider an actual listening result of the channel by the first panel, whether the first panel meets the preset condition is further determined, to avoid a problem of a transmission conflict and a transmission failure caused by a false determination that the first panel obtains permission to use the channel. In addition, a candidate panel that meets the preset condition is further searched from another panel except the first panel, to facilitate spatial reuse of the panel. Because the plurality of panels may be used to send the frame, efficiency of information transmission is further improved.

In a possible implementation, if the backoff count value is not zero and when detecting that the channel is idle in a current slot, one is subtracted from the backoff count value. When detecting that the channel is busy in the current slot, a backoff process of the first panel is suspended and a backoff count value and a contention window of the first panel are retained, where the first panel is a panel corresponding to the backoff count value in the plurality of panels.

It can be learned that if the backoff count value is not zero, it indicates that the network device does not obtain permission to use the channel. In this case, the network device suspends the backoff process of the first panel, and processes the backoff count value of the first panel based on the channel state in the current slot. To be specific, the network device normally performs backoff, so that the network device can contend with another network device for permission to use the channel.

According to a fifth aspect, embodiments of this application provide a network device, where the network device includes a memory, a processor, and a plurality of panels. The processor corresponds to the plurality of panels, and the memory stores computer instructions. The processor executes the computer instructions stored in the memory, so that the network device performs the channel access method according to any implementation of the third aspect or the channel access method according to any implementation of the fourth aspect.

According to a sixth aspect, embodiments of this application provide a network device, where the network device includes a memory, a plurality of processors, and a plurality of panels. Each processor corresponds to one panel, and the memory stores computer instructions. One of the processors executes the computer instructions stored in the memory, so that the network device performs the channel access method according to any implementation of the third aspect or the channel access method according to any implementation of the fourth aspect.

According to a seventh aspect, embodiments of this application provide a computer-readable storage medium, where the computer-readable storage medium is configured to store executable program code. When the program code is executed by a device, the device is configured to implement the channel access method according to any implementation of the third aspect or is configured to implement the channel access method according to any implementation of the fourth aspect.

According to an eighth aspect, embodiments of this application provide a computer program product. The computer program product includes instructions. When the instructions are run on a computer, the computer is configured to implement the channel access method according to any implementation of the third aspect or is configured to implement the channel access method according to any implementation of the fourth aspect.

DESCRIPTION OF EMBODIMENTS

Figure 1:
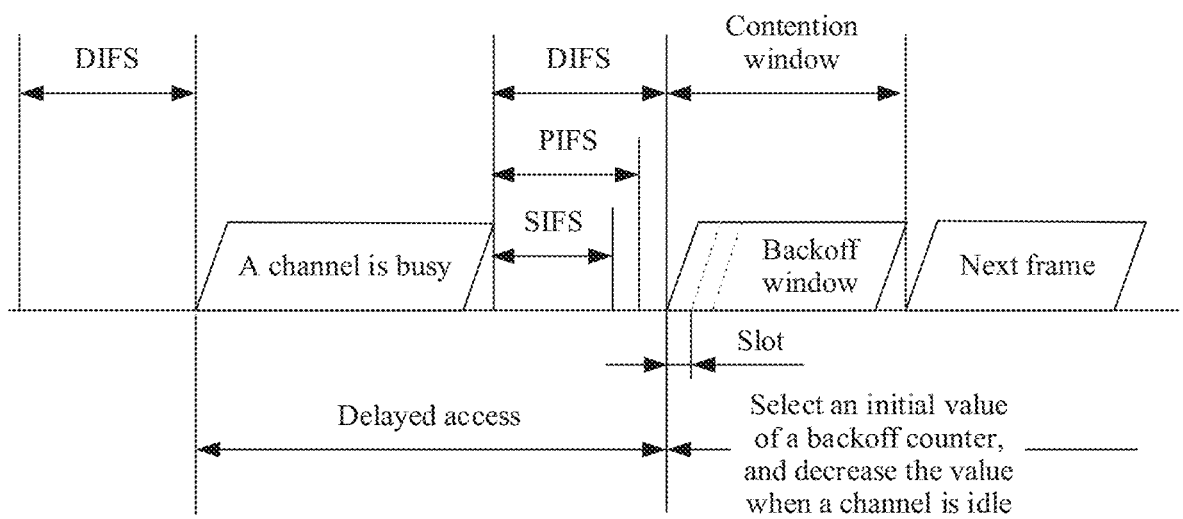
FIG. 1 is a schematic diagram of channel listening according to an embodiment of this application.

To ensure that an access point (Access Point, AP) and a station (Station, STA) can access a channel and do not collide with each other, a carrier sense multiple access with collision avoidance (Carrier Sense Multiple Access with Collision Avoidance, CSMA/CA) mechanism is used in 802.11. This mechanism is referred to as a distributed coordination function (Distributed Coordination Function, DCF). As shown in FIG. 1, before sending data, a STA first performs listening to of a fixed duration on a channel (for example, distributed coordination function inter-frame space (Distributed Coordination Function Inter-Frame Space, DIFS)) to perform a clear channel assessment (Clear Channel Access, CCA). If the channel is idle, the STA obtains permission to use the channel and may send a frame. If the channel is busy, the STA needs to delay for a fixed duration. For example, if the STA detects that the channel remains idle within an X interframe space (X Interframe Space, XIFS) in the fixed delay duration, the STA randomly selects, from a contention window (Contention Window, CW), a value as a backoff count value, and performs a random back off (Back Off, BO) based on the backoff count value. If the backoff count value backs off to zero, the STA considers that the channel is idle, obtains permission to use the channel, and may send the frame. The X interframe space includes the DIFS, a point coordination function inter-frame space (Point Coordination Function Inter-Frame Space, PIFS), and a short inter-frame space (Short Inter-Frame Space, SIFS).

Figure 2:
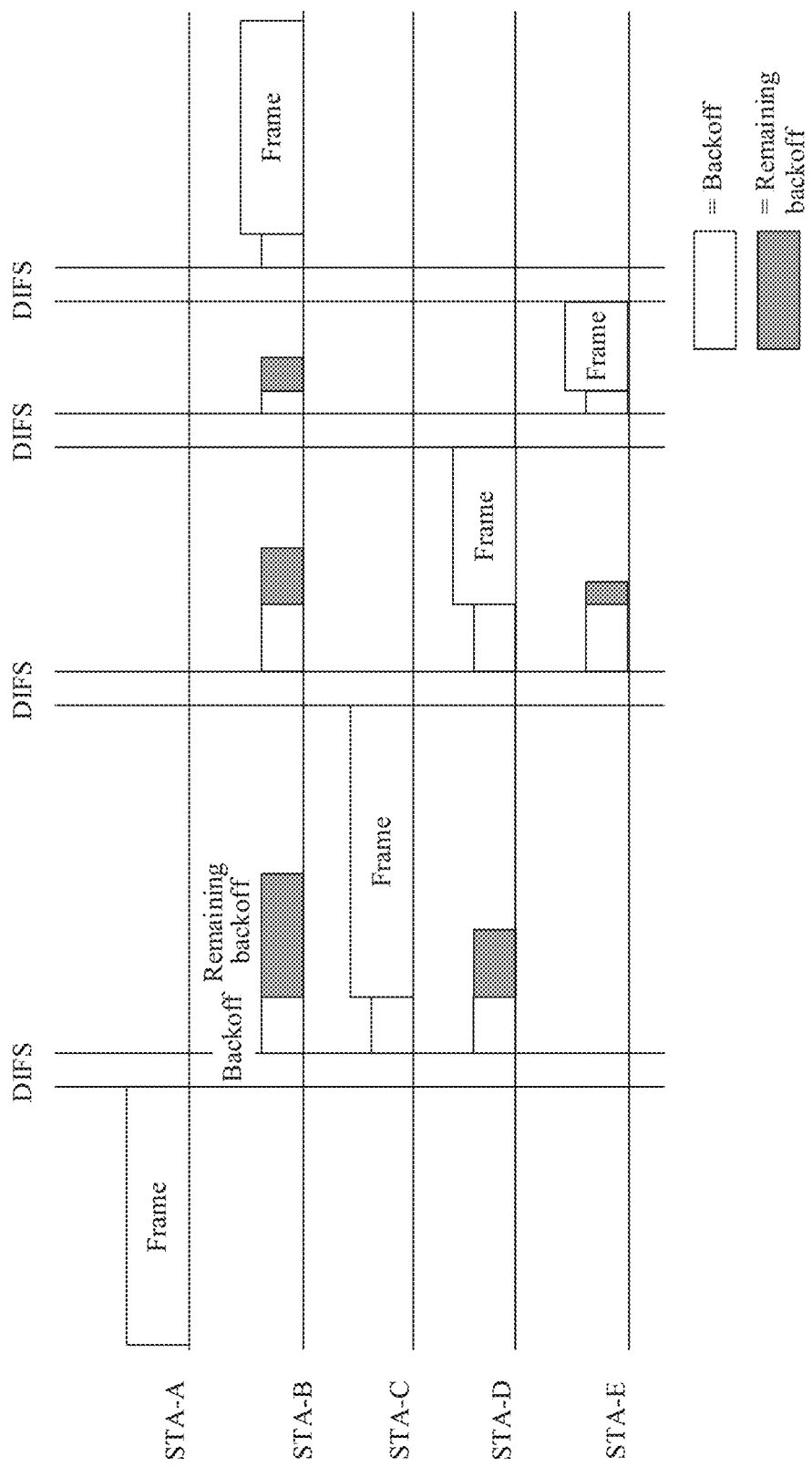
FIG. 2 is a schematic diagram of backoff between a plurality of STAs according to an embodiment of this application.

When a plurality of STAs need to send data, each STA needs to use the DCF to listen to a channel. As shown in FIG. 2, when a STA-A sends a frame, a STA-B, a STA-C, a STA-D, and a STA-E also need to send a frame. The STA-B, the STA-C, the STA-D, and the STA-E first listen to the channel before sending the frame, and detect that the channel is busy. Therefore, the STA-B, the STA-C, the STA-D, and the STA-E delay a fixed duration, and detect, within the fixed delay duration XIFS, that the channel remains idle. The STA-B, the STA-C, the STA-D, and the STA-E randomly select a backoff count value in CWs of the STA-B, the STA-C, the STA-D, and the STA-E, and perform random BO based on backoff count values of the STA-B, the STA-C, the STA-D, and the STA-E. In a random BO process, if it is detected that the channel is idle, a backoff count value is decreased by 1. If it is detected that the channel is busy, a backoff process is suspended, that is, a current backoff count value and a contention window are retained. When a backoff count value of a STA first backs off to zero, it is determined that the STA first obtains permission to use the channel, and may send a frame. As shown in FIG. 2, a backoff count value of the STA-C first backs off to zero. Therefore, the STA-C first obtains permission to use the channel. In other words, the STA-C may first send the frame. Then, the other STAs suspend their own backoff processes. After the STA-C sends the frame, the other STAs resume their own backoff processes, and continue to perform backoff until all the other STAs complete sending frames.

Figure 3A:
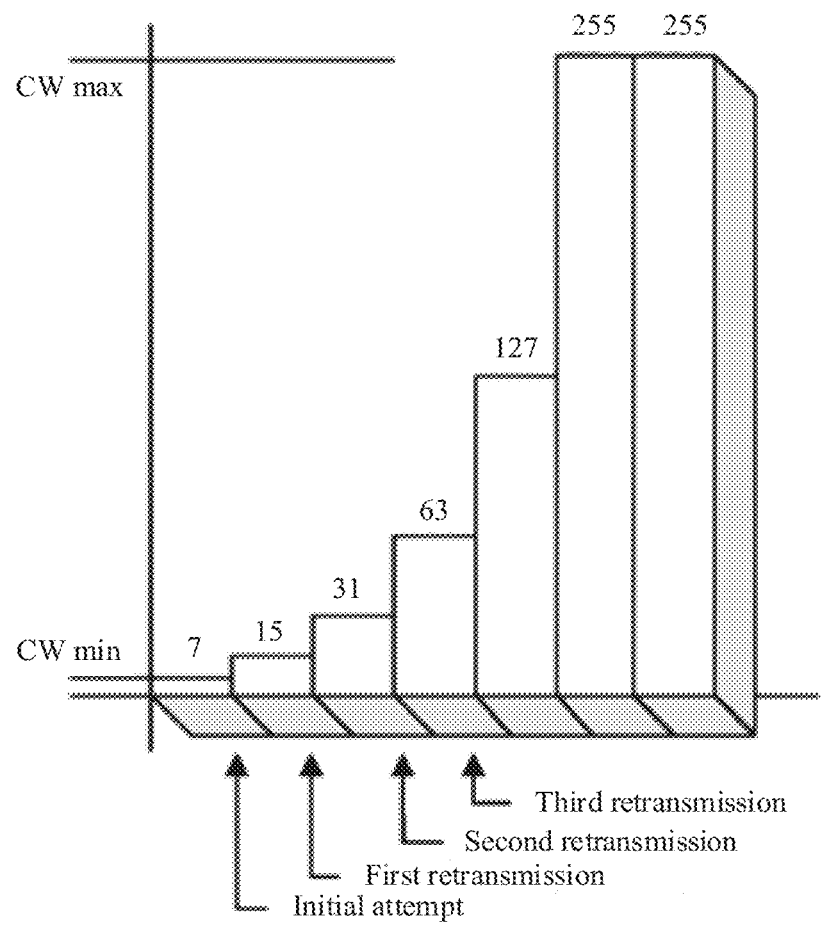
FIG. 3a is a schematic diagram of doubling a contention window according to an embodiment of this application.

In addition, after the STA obtains permission to use the channel, the frame may fail to be sent. For example, if backoff count values selected by two STAs are the same, backoff of the two STAs back off to zero at the same time. This causes a transmission conflict, and further causes a frame sending failure. To resolve the frame sending failure of the STA, when the STA fails to send the frame, as shown in FIG. 3a, a CW is doubled. Then, a backoff count value is re-selected in the doubled CW, and backoff is performed again based on the backoff count value. A value range of the CW may include a plurality of values. Specifically, if the value range of the CW during an initial attempt (Initial Attempt) is a minimum value, that is, CWmin, CW is [0, CWmin]. However, retransmission (Retransmission) needs to be performed each time a collision occurs, and the value range of the CW increases gradually until a value of the CW reaches a maximum value, that is, CWmax. When data is successfully sent, the STA resets (reset) the CW to CWmin. When the CW is doubled, the CW is twice as much in number.

In addition, a CSMA/CA mechanism is implemented based on carrier sensing (Carrier Sensing, CS). The CS includes physical carrier sensing and virtual carrier sensing. Therefore, when the DCF function is used to perform channel listen, both the physical carrier sensing function and the virtual carrier sensing function need to be used to determine a channel state. The physical carrier sensing function is located at a PHY (Physical layer, physical layer). Whether a channel is busy is determined by using energy detection (Energy Detection, ED) and preamble detection (Preamble Detection, PD). Virtual carrier sensing is located at MAC (Media Access Control, Media Access Control). A STA declares exclusive access to a channel by carrying preset information in a duration (Duration) field of a MAC frame header. The virtual carrier sensing function is also referred to as a network allocation vector (Network Allocation Vector, NAV). When the STA listens to the channel by using the DCF function, the STA determines that the channel is idle only when both the physical carrier sensing function and the virtual carrier sensing function detect that the channel is idle. Otherwise, the STA determines that the channel is busy.

However, all the STAs mentioned above are single-panel devices. In the foregoing DCF mechanism, regardless of whether the STA listens to the channel by using the physical carrier listening function or the virtual carrier sensing function, the STA listens to the channel through one panel. To introduce more spatial flows in the next generation WLAN, an MP MIMO technology is intended to be introduced to increase spatial flows. The MP MIMO technology refers to that a network device includes a plurality of panels that are interconnected, where each panel includes one or more antenna interfaces, and each antenna interface is equipped with one or more transceiver antennas. In this way, antenna resources of a network device are distributed to a plurality of panels that are close to or far from each other. In addition, to improve coverage areas and spatial diversity gains of the plurality of panels of the network device, the plurality of panels are usually disposed in different geographical locations. As a result, channel states sensed by the plurality of panels are different. If the plurality of panels sense different channel states, how the network device accesses the channel by using the plurality of panels, so that a collision does not occur between the network device and another STA is currently still unknown.

For ease of understanding of this application, related technological knowledge in embodiments of this application is first described herein.

A multi-panel device (MP device) is a device that has a plurality of panels close to or remote from each other, and may transmit information through one or more panels. Each panel includes one or more antenna interfaces. Therefore, the panel may also be referred to as an antenna interface in this application. Each antenna interface is equipped with one or more transceiver antennas.

Figure 3B:
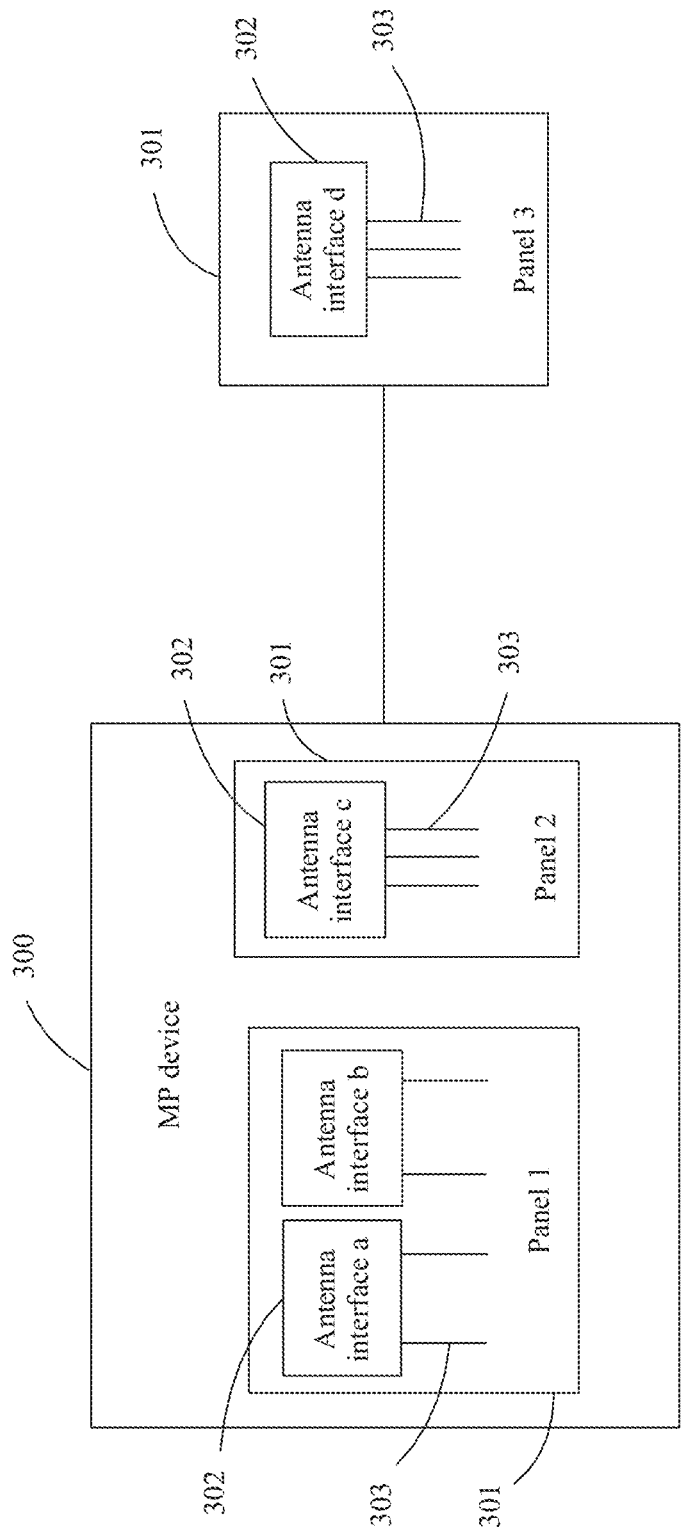
FIG. 3b is a schematic diagram of a structure of an MP device according to an embodiment of this application.

FIG. 3b is a schematic diagram of a structure of a multi-panel device according to an embodiment of this application. As shown in FIG. 3b, the MP device includes a plurality of panels 301 (panel 1 to panel 3 in FIG. 3b) and a plurality of antenna interfaces 302 (antenna interface a to antenna interface d in FIG. 3b). A panel 301 includes at least one antenna interface 302 (as shown in FIG. 3b, the panel 1 includes the antenna interface a and the antenna interface b, the panel 2 includes the antenna interface c, and the panel 3 includes the antenna interface d). One or more antennas 303 are disposed on each panel. An antenna 303 disposed on each panel 301 is connected to an antenna interface 302 corresponding to the panel.

A single-panel device is a device that transmits information through one panel.

A STA is a logical entity having media access control and physical layer functions in the IEEE 802.11 standard, and is a general term for an access point (Access Point) and a non-AP station (non-AP STA) in the IEEE 802.11 standard.

Intra basic service set network allocation vector (Intra Basic Service Set Network Allocation Vector, Intra-BSS NAV): If the STA receives a frame from a basic service set (Basic Service Set Network. BSS) in which the STA is located, the STA updates an intra-BSS NAV of the STA.

Basic network allocation vector (Basic Network Allocation Vector. Basic NAV): When the STA receives a frame from another BSS or cannot distinguish whether the frame is from the BSS in which the STA is located or another BSS, the STA updates a basic NAV of the STA.

The network device mentioned in embodiments of this application may be an apparatus or a chip that has a wireless communication function. For example, for a communication apparatus that supports a Wi-Fi protocol, the network device may be a network side device or a terminal device. A product form thereof may be, for example, but is not limited to, a communication server, a router, a switch, a bridge, a computer, a tablet computer, a laptop computer, a mobile Internet device, a personal digital assistant, a desktop computer, a mobile phone, or another terminal. The another terminal may alternatively be an Internet of Things node in the Internet of Things, for example, a sensor or a smart water meter in a smart city, a smart camera or a smart set-top box in a smart home, or a device or a sensor in the Internet of Vehicles.

The following describes technical solutions in this application with reference to the accompanying drawings.

Figure 4:
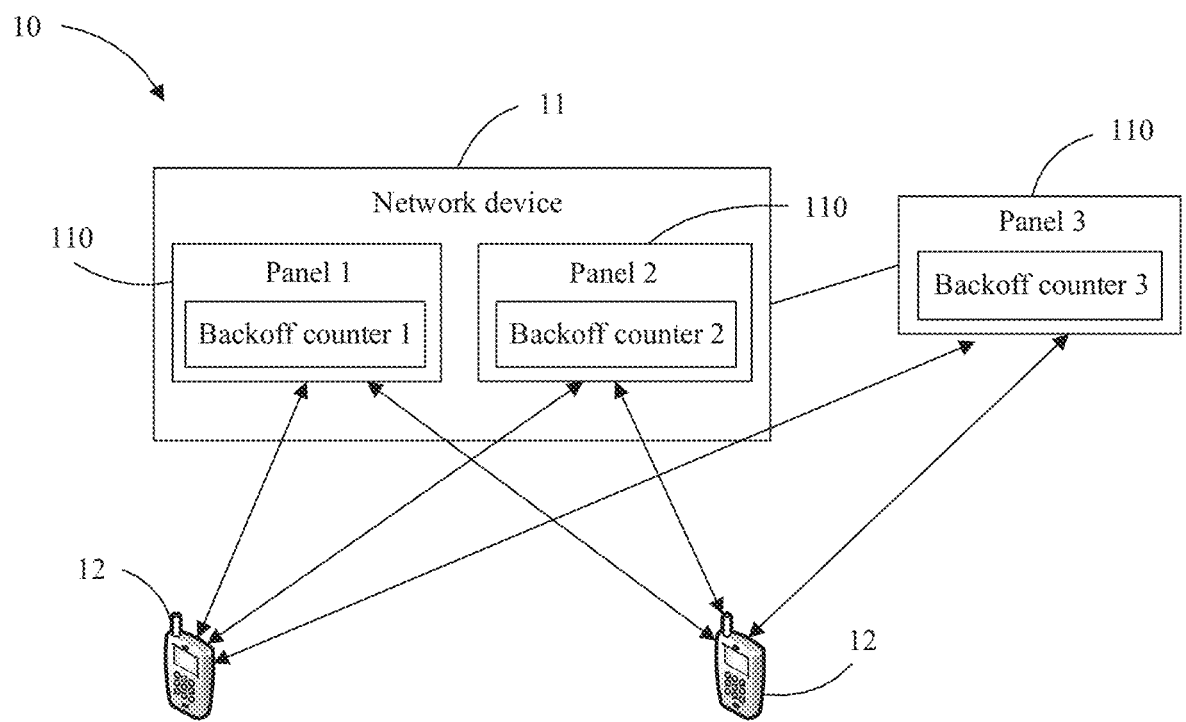
FIG. 4 is a schematic diagram of a network architecture of a communication system according to an embodiment of this application.

FIG. 4 is a schematic diagram of a network architecture of a communication system according to an embodiment of this application. A communication system 10 includes a network device 11 and one or more STAs 12. A network device 11 includes a plurality of panels 110. Each panel 110 may be deployed with one or more antennas. When the network device 11 and the one or more STAs 12 need to send data at the same time, the network device 11 and the one or more STAs 12 contend for permission to use a channel. To enable the network device 11 to contend for permission to use the channel, one independent backoff counter is set for each panel 110. In this way, when contending for permission to use the channel, the network device 11 randomly generates a backoff count value for each panel 110. Then, the network device 11 maintains a backoff process for each panel, and performs, based on a channel state detected by each panel, a backoff operation on a backoff counter corresponding to each panel. If a backoff count value of any one of the plurality of panels 110 backs off to zero, the network device 11 determines that permission to use the channel is obtained, and sends a frame.

It can be learned that one backoff counter is set for each panel 110 of the network device 11, and the network device 11 maintains the backoff process for each panel. If a backoff count value of any panel backs off to zero, it is determined that the network device 11 obtains permission to use the channel. In this case, the network device 11 may access the channel. Therefore, the network device 11 can successfully access the channel when the plurality of panels sense different channel states. Because independent backoff is performed between the network device 11 and another device, when a multi-panel device accesses a channel, the multi-panel device does not collide with the another device. Because a multi-panel device may be used to send a frame, a spatial flow is increased, a throughput during information transmission is improved, and information transmission efficiency is further improved.

Figure 5:
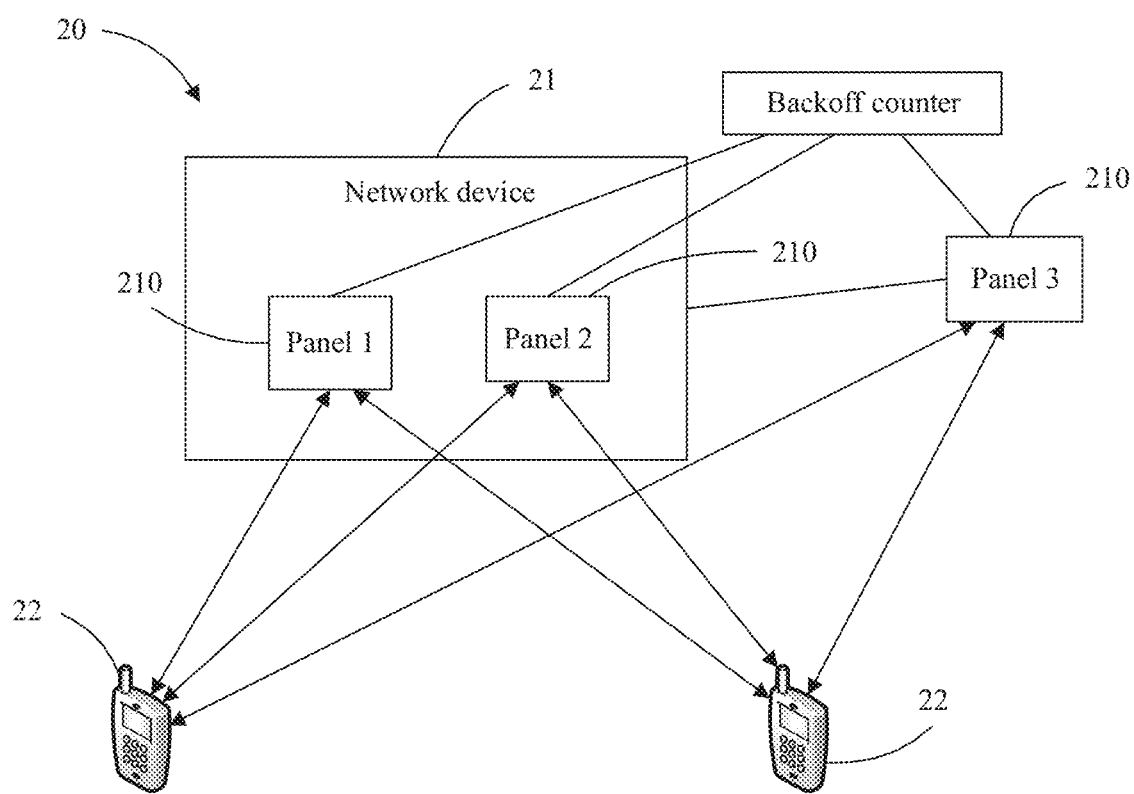
FIG. 5 is a schematic diagram of a network architecture of another communication system according to an embodiment of this application.

FIG. 5 is a schematic diagram of a network architecture of another communication system according to an embodiment of this application. A communication system 20 includes a network device 21 and one or more STAs 22. The network device 21 includes a plurality of panels 210. Each panel 210 may be deployed with one or more antennas. When the network device 21 and the one or more STAs 22 need to send data at the same time, the network device 21 and the one or more STAs 22 contend for permission to use a channel. To enable the network device 21 to obtain, through contention, permission to use the channel, one backoff counter is set for the plurality of panels 210. In other words, the plurality of panels 210 share one backoff counter. In this way, when contending for permission to use the channel, the network device 21 randomly generates a backoff count value for the plurality of panels 210. Then, the network device 21 maintains a backoff process, and performs a backoff operation on the backoff counter based on a channel state detected by one or more panels. If the backoff count value backs off to zero, the network device 21 determines that permission to use the channel is obtained, and that the network device sends a frame.

It can be learned that one backoff counter is set for the plurality of panels 210 of the network device 21. When the network device 21 contends for permission to use the channel, the network device maintains the backoff process. If the backoff count value backs off to zero, it is determined that the network device 21 obtains permission to use the channel. In this case, the network device may access the channel, so that the network device can successfully access the channel when the plurality of panels sense different channel states. In addition, one backoff counter is set for the plurality of panels 210, and the network device 21 maintains only one backoff process in the backoff process, thereby reducing complexity of the backoff process and reducing processing load of the network device 21.

Figure 6:
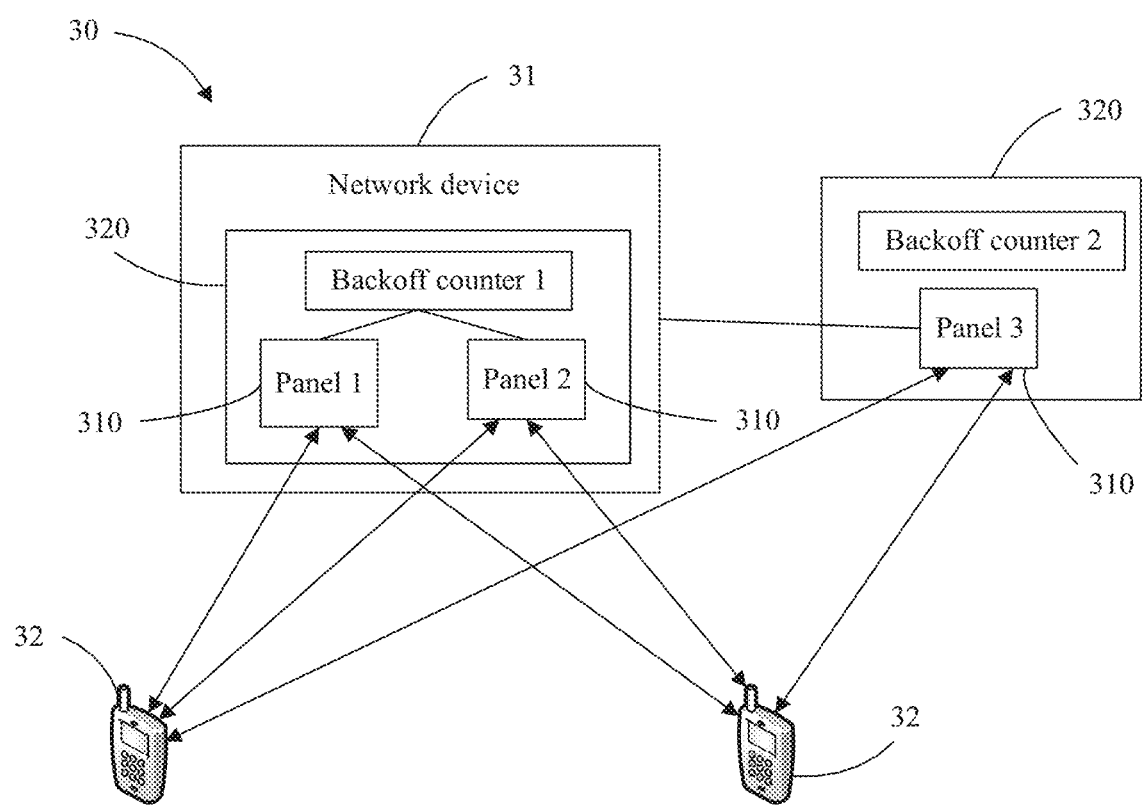
FIG. 6 is a schematic diagram of a network architecture of still another communication system according to an embodiment of this application.

FIG. 6 is a schematic diagram of a network architecture of still another communication system according to an embodiment of this application. A communication system 30 includes a network device 31 and one or more STAs 32. The network device 31 includes a plurality of panels 310. Each panel 310 may be deployed with one or more antennas. When the network device 31 and the one or more STAs 32 need to send data at the same time, the network device 31 and the one or more STAs 32 contend for permission to use a channel. To enable the network device 31 to obtain, through contention, for permission to use the channel, the plurality of panels 310 are first grouped to obtain a plurality of panel groups 320. Each panel group 320 is equivalent to one panel. As shown in FIG. 6, a panel group 320 includes a panel 1 and a panel 2, another panel group 320 includes a panel 3, and one backoff counter is separately set for each panel group 320. In this way, when contending for permission to use the channel, the network device 31 randomly generates a backoff count value for each panel group 320. Then, for the backoff count value of each panel group 320, the network device 31 maintains an independent backoff process for each panel group 320. If a backoff count value of any one of the plurality of panel groups 320 backs off to zero, the network device 31 determines that permission to use the channel is obtained, and sends a frame.

It can be learned that the plurality of panels 310 of the network device 31 are first grouped, and each panel group is equivalent to one panel, so that when there are a larger quantity of panels, complexity of a backoff process is reduced, and load of processing the backoff process by the network device is reduced. In addition, when contending for permission to use the channel, the network device 31 randomly generates the backoff count value for each panel group 320, and maintains the independent backoff process for each panel group 320. If the backoff count value of the any panel group 320 backs off to zero, it is determined that the network device 31 obtains permission to use the channel. In this case, the network device 31 may access the channel, so that the network device can successfully access the channel when sensing of channel states by the plurality of panels are different.

Figure 7:
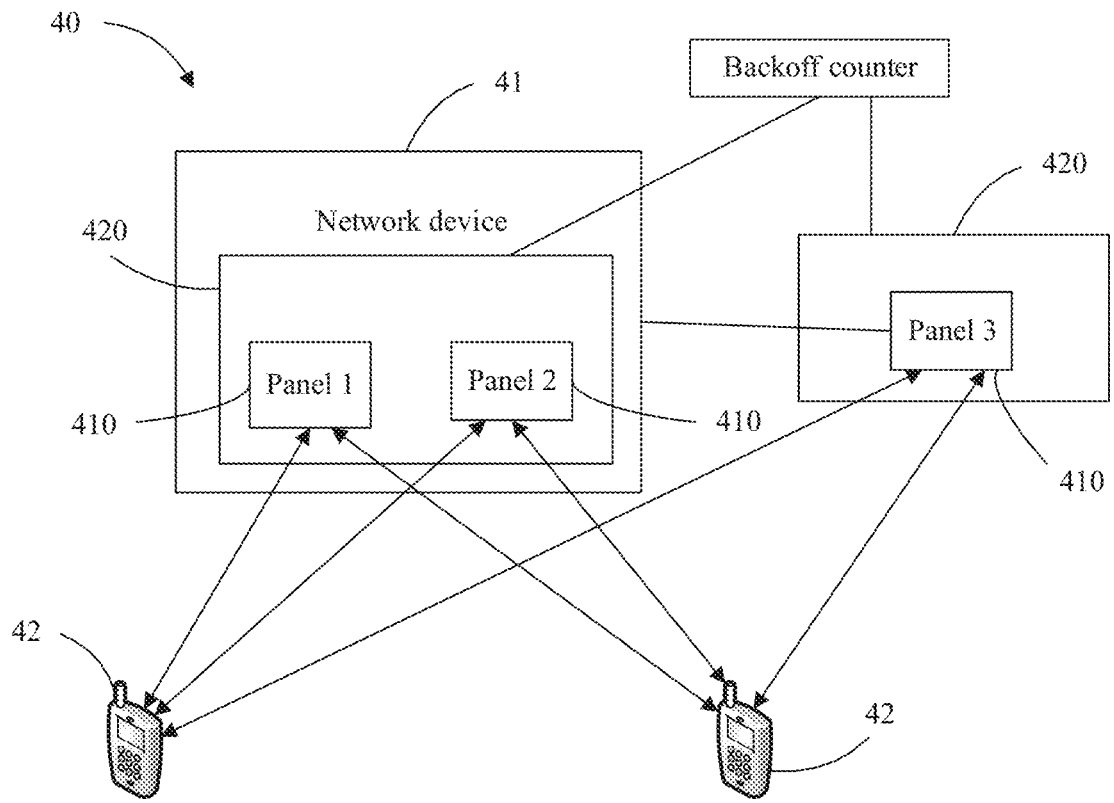
FIG. 7 is a schematic diagram of a network architecture of yet another communication system according to an embodiment of this application.

FIG. 7 is a schematic diagram of a network architecture of yet another communication system according to an embodiment of this application. The communication system 40 includes a network device 41 and one or more STAs 42. The network device 41 includes a plurality of panels 410. Each panel 410 may be deployed with one or more antennas. When the network device 41 and the one or more STAs 42 need to send data at the same time, the network device 41 and the one or more STAs 42 contend for permission to use a channel. To enable the network device 41 to obtain, through contention, for permission to use the channel, the plurality of panels 410 are first grouped to obtain a plurality of panel groups 420. Each panel group 420 is equivalent to one panel. As shown in FIG. 7, a panel group 420 include a panel 1 and a panel 2, and another panel group 420 includes a panel 3. Then, a backoff counter is set for a plurality of panel groups 420. In this way, when contending for permission to use the channel, the network device 41 randomly generates a backoff count value for the plurality of panel groups 420. Then, the network device 41 maintains a backoff process based on the backoff count value. If the backoff count value backs off to zero, the network device 41 determines that permission to use the channel is obtained, and sends a frame.

It can be learned that the plurality of panels 410 of the network device 41 are first grouped, and each panel group is equivalent to one panel, so that when there are a large quantity of panels, complexity of a backoff process is reduced, and load of processing the backoff process by the network device is reduced. Then, one backoff counter is set for the plurality of panel groups 420, to resolve a problem that when there are a large quantity of panels, even if the panels are grouped, there are still a large quantity of obtained panel groups 420. In this case, the backoff process is still complex. In addition, when contending for permission to use the channel, the network device 41 maintains the backoff process for the plurality of panel groups 420. If the backoff count value backs off to zero, it is determined that the network device 41 obtains permission to use the channel. In this case, the network device 41 may access the channel, so that the network device can successfully access the channel when sensing of channel states by the plurality of panels are different.

It should be noted that, in the communication systems in FIG. 4 to FIG. 6, an example in which the STA 32 is a single-panel device is used for description. In actual application, the STA 32 may also be a multi-panel device. When the STA 32 is a multi-panel device, a process of accessing the channel by the STA 32 is similar to a process of accessing the channel by the network device 31, and details are not described again.

In addition, in the communication systems shown in FIG. 4 to FIG. 6, the plurality of panels (for example, the plurality of panels 110, 210, 310, and 410) may include one or more panels whose deployment locations are far away from other panels. The one or more panels may be referred to as remote panels. The plurality of panels 410 in FIG. 7 are used as an example for description. A distance between the panel 3 and the panel 1 and a distance between the panel 3 and the panel 2 are long. In this way, the network device may have a remote antenna interface, and antenna deployment flexibility can be improved.

Figure 8:
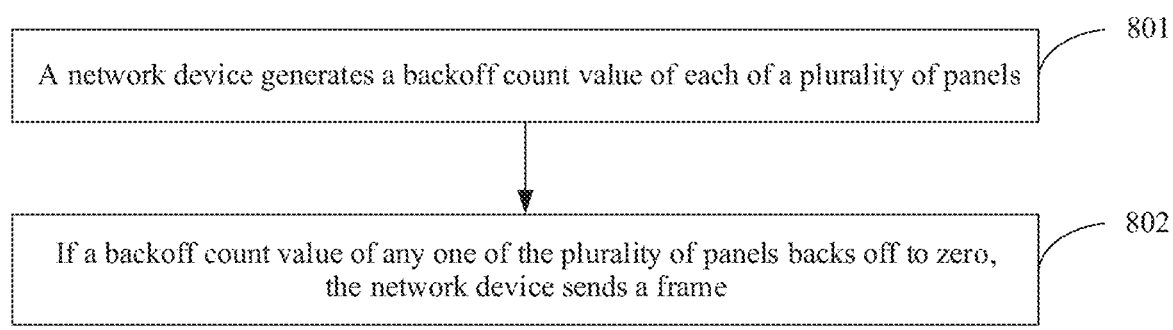
FIG. 8 is a schematic flowchart of a channel access method according to an embodiment of this application.

FIG. 8 is a schematic flowchart of a channel access method according to an embodiment of this application. The method is applied to the network device shown in FIG. 4. The network device may be a network side device, or may be a terminal device. The method in this embodiment includes the following steps:

801: A network device generates a backoff count value of each of a plurality of panels.

When the network device needs to use a channel resource at a current moment, the network device listens to a channel to obtain permission to use the channel.

Specifically, one backoff counter is first set for each panel. In other words, each panel has its own CW, and the network device maintains an independent backoff process for each panel. In other words, at the current moment, the network device listens to the channel in an XIFS through each panel. If the network device detects that the channel remains idle, the network device randomly selects an integer in the CW of the panel as a backoff count value of the panel, and the network device performs backoff based on the backoff count value.

It should be noted that channel states sensed by each panel are different. Therefore, listening results of the channel states by the network device in the XIFS through all panels are not necessarily completely the same. In other words, in an XIFS, the network device may detect, through some panels, that a channel is idle, and detect, through the other panels, that the channel is busy. For a panel that detects that a channel is idle, a backoff count value corresponding to the panel is generated, and a backoff process is maintained for the panel based on the backoff count value. For a panel that detects that a channel is busy, the network device needs to wait for a fixed duration, and continues to listen to the channel in a next XIFS. If it is detected, through the panel in the next XIFS, that the channel remains idle, the network device maintains the backoff process for the panel based on the backoff count value randomly generated for the panel.

This application specifically describes a case that each panel maintains a backoff process.

802: If the backoff count value of the any one of the plurality of panels backs off to zero, the network device sends a frame.

If the backoff count value of the any one of the plurality of panels backs off to zero, it indicates that the network device obtains permission to use the channel, and the network device may send the frame.

It can be learned that one backoff counter is set for each panel of the network device. When contending for permission to use the channel, the network device maintains the backoff process for each panel. If the backoff count value of the any one of the panels backs off to zero, it is determined that the network device obtains permission to use the channel. In this case, the network device may access the channel. Therefore, the network device can successfully access the channel when the plurality of panels sense different channel states.

In a possible implementation, if the backoff count value of the first panel in the plurality of panels backs off to zero, it is determined that the first panel obtains permission to use the channel, and the network device may send the frame through the first panel. In addition, for other panels whose backoff count values are not zero in the plurality of panels, that is, all panels except the first panel, a backoff process needs to be suspended, and a backoff count value and a contention window of each of the other panels need to be retained.

Figure 9:
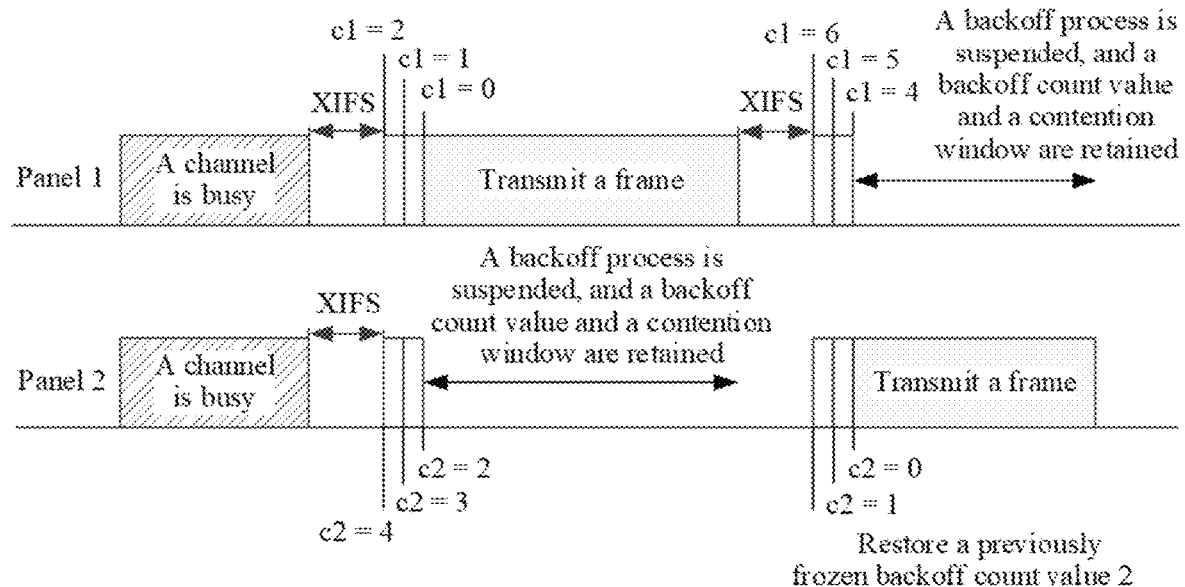
FIG. 9 is a schematic diagram of a backoff process of a network device according to an embodiment of this application.

As shown in FIG. 9, a backoff count value c1 of a panel 1 is 2, and a backoff count value c2 of a panel 2 is 4. Therefore, the backoff count value of the panel 1 first backs off to zero. When the backoff count value c1 of the panel 1 backs off to zero, the network device sends a frame through the panel 1, suspends a backoff process of the panel 2, and retains a contention window and the backoff count value of the panel 2. After the frame is sent through the panel 1, if it is detected, within an XIFS, that a channel remains idle, a backoff process of the panel 1 is reset, and the backoff process of the panel 2 is resumed. In other words, a previously frozen backoff count value c2 is used to continue performing backoff. It can be learned that after the backoff process of the panel 1 is reset, the backoff count value c2 of the panel 2 first backs off to zero. Therefore, the frame may be sent through the panel 2, and the backoff process of the panel 1 is suspended.

In a possible implementation, when the backoff count value of the first panel in the plurality of panels backs off to zero, for another panel whose backoff count value does not back off to zero in the plurality of panels, that is, all panels except the first panel, a backoff process of each of the other panels may be suspended, and a backoff count value of each panel is reset. A backoff window of each panel may be reset or retained.

Figure 10:
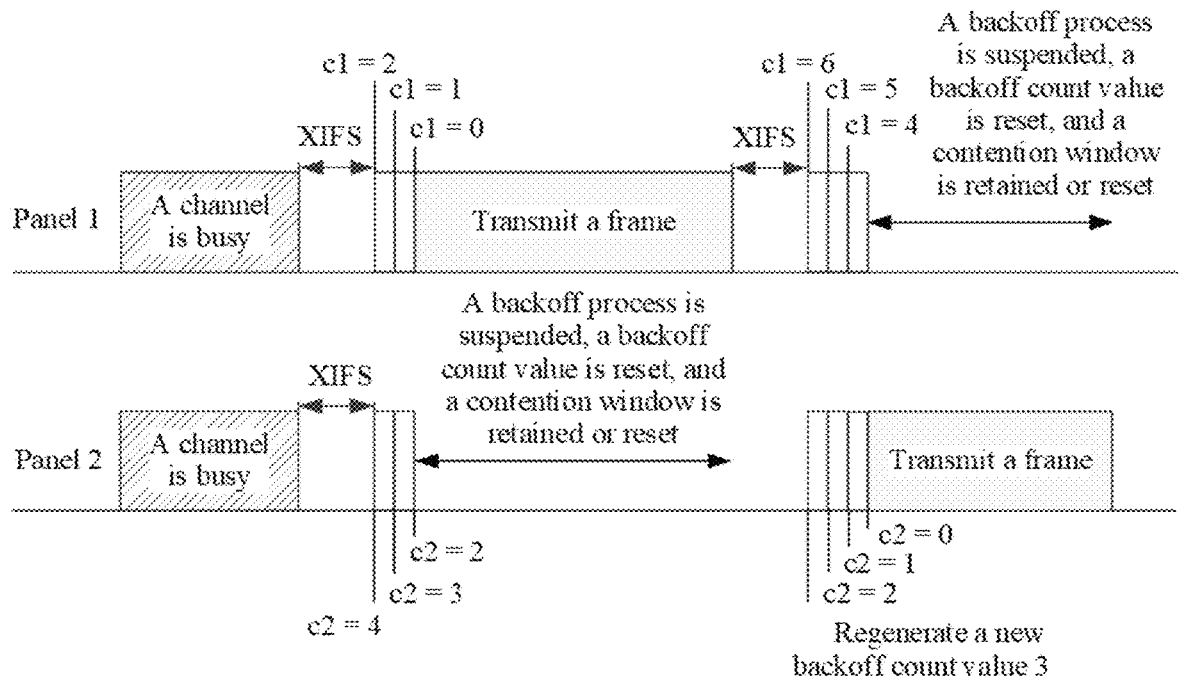
FIG. 10 is a schematic diagram of another backoff process of a network device according to an embodiment of this application.

As shown in FIG. 10, when the backoff count value c1 of the panel 1 backs off to zero, the backoff process of the panel 2 is suspended. When a next backoff process is performed on the panel 2, the backoff count value c2 of the panel 2 is reset (in other words, a new backoff count value 3 is generated). Backoff is performed on the panel 2 again based on the new backoff count value.

It can be learned that in this implementation, if a backoff count value of any panel backs off to zero, it indicates that the network device obtains permission to use the channel. In this case, a backoff count value of another panel that does not back off to zero is reset, so that the network device re-contends for permission to use the channel, thereby ensuring fairness of contending for permission to use the channel by the network device and another conventional device (a single-panel device).

In a possible implementation, if the backoff count value of the first panel in the plurality of panels backs off to zero, before sending the frame through the first panel, the network device further needs to determine whether there is a candidate panel that meets a preset condition. The candidate panel is one or more panels that meet the preset condition in all panels of the plurality of panels except the first panel. The preset condition is detecting, through the panel in a preset time period, that the channel remains idle. The preset time period is a time period before a current moment. The current moment is a moment at which the backoff count value of the first panel backs off to zero. If there is a candidate panel that meets the condition, it is equivalent that the candidate panel also obtains permission to use the channel, and the network device may send the frame through the first panel and/or the candidate panel. In other words, if there is the candidate panel, the network device may send the frame through the first panel and one or more of all panels corresponding to all candidate panels that meet the preset condition.

The preset time period may be a DIFS, a PIFS, an SIFS, or another value.

Further, for a panel that does not meet the preset condition in all panels of the plurality of panels except the first panel, when the backoff count value of the first panel backs off to zero, a backoff process of the panel may be suspended, and a contention window and a backoff count value of the panel are retained. For a candidate panel that meets the preset condition, if the frame is sent through the candidate panel, a backoff process of the candidate panel does not need to be suspended, and the backoff process of the candidate panel needs to be reset after the frame is sent through the candidate panel. If the candidate panel is not used to send the frame, the backoff process of the candidate panel needs to be suspended, and a contention window and a backoff count value of the candidate panel are retained. In addition, for the first panel, because the backoff count value of the first panel backs off to zero, it indicates that the network device obtains, through contention, permission to use the channel. Therefore, whether the first panel is used to send the frame or not, to ensure that another conventional device can obtain, through contention, permission to use the channel, the backoff process of the first panel needs to be reset after the network device sends the frame.

Figure 11:
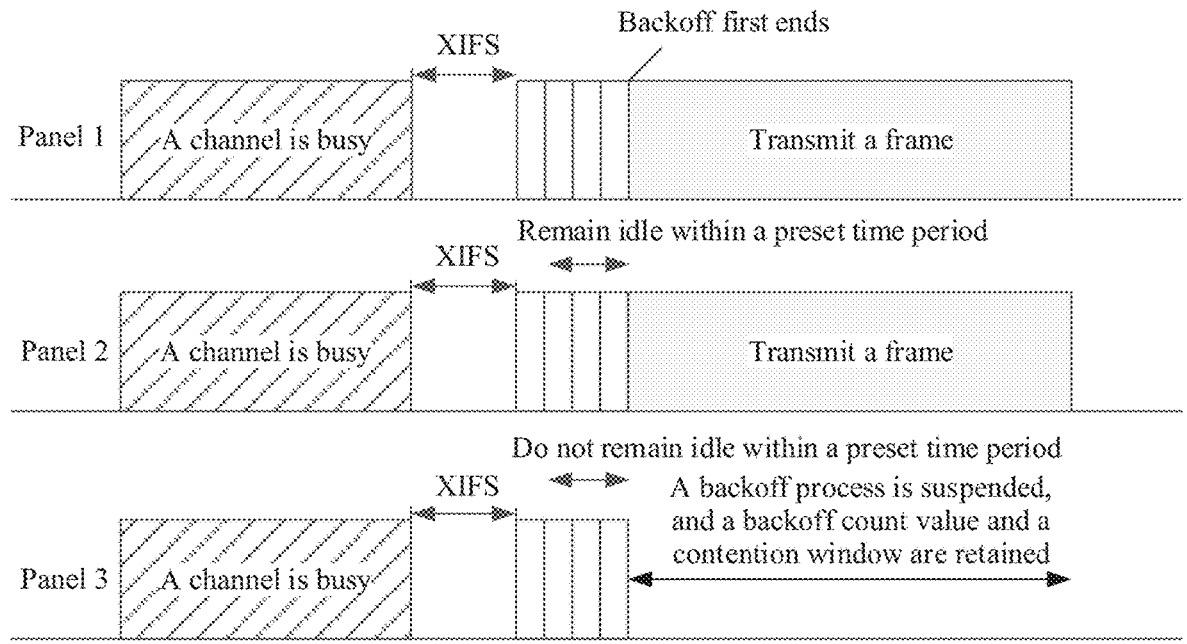
FIG. 11 is a schematic diagram of still another backoff process of a network device according to an embodiment of this application.

As shown in FIG. 11, the backoff count value of the panel 1 backs off to zero, and it is determined that the panel 1 obtains permission to use the channel. Then, it is determined whether there is a candidate panel that meets the preset condition in the panel 1 and the panel 2. As shown in FIG. 11, if the panel 2 detects, in the preset time period, that the channel remains idle, it is determined that the panel 2 is the candidate panel (FIG. 11 shows only one candidate panel, and there may be a plurality of candidate panels in actual application), and it indicates that the panel 2 also obtains permission to use the channel. However, when the panel 3 listens to within the preset time that the channel does not remain idle, the panel 3 is not the candidate panel. Therefore, when the backoff count value of the panel 1 backs off to zero, a backoff process of the panel 3 is suspended, and a backoff count value and a contention window of the panel 3 are retained. If the panel 2 is used to send the frame, the backoff process of the panel 2 does not need to be suspended, and the backoff process of the panel 2 is reset after the panel 2 is used to send the frame. If the panel 2 is not used to send a frame, the backoff process of the panel 2 needs to be suspended, and the backoff count value and the contention window of the panel 2 are retained.

Figure 12:
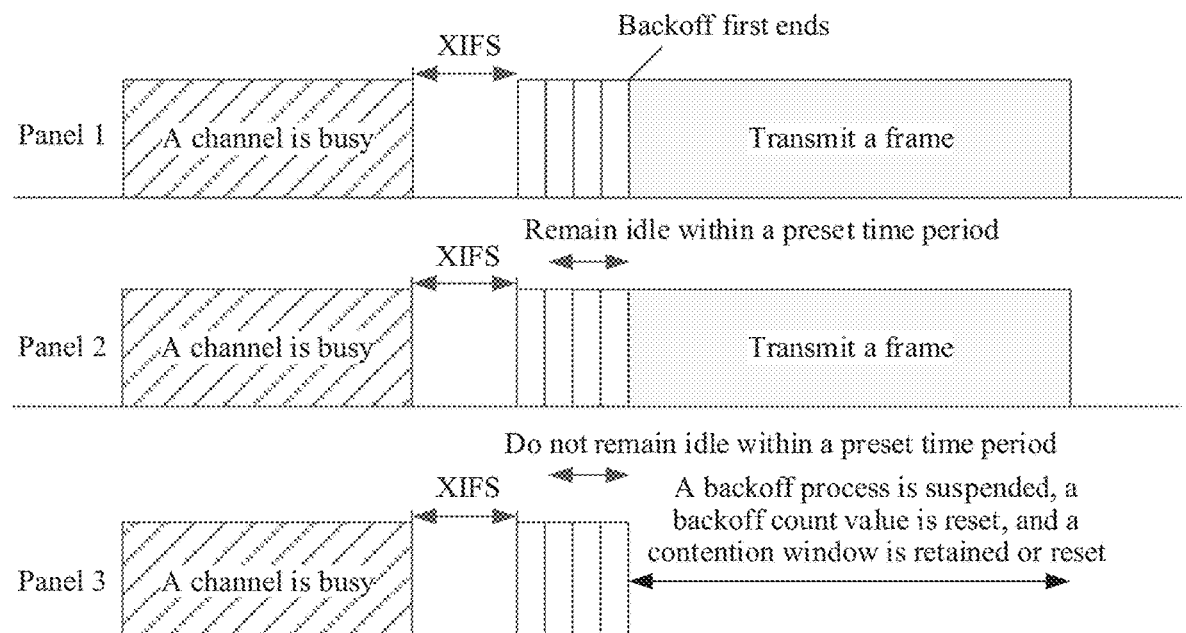
FIG. 12 is a schematic diagram of yet another backoff process of a network device according to an embodiment of this application.

Optionally, corresponding to the foregoing implementation, as shown in FIG. 12, when a backoff process of a panel is suspended, a backoff count value of the panel may be reset, and a contention window of the panel may be retained or reset. Because the backoff count value is reset, the network device re-contends for permission to use the channel, thereby ensuring fairness of contending for permission to use the channel by the network device and another conventional device (a single-panel device).

In a possible implementation, if a backoff count value of any one of the plurality of panels does not back off to zero, and it is detected, through the panel, that the channel is idle in a current slot, the backoff count value of the panel is decreased by 1. In addition, when it is detected, through the panel, that the channel is busy in the current slot, a backoff process of the panel is suspended, and a backoff count value and a backoff window of the panel are retained.

In a possible implementation, for a panel that obtains permission to use the channel, if the network device sends the frame through the panel, and the sending fails, the network device doubles the contention window of the panel, regenerates a backoff count value of the panel based on the doubled contention window, and maintains a new backoff process for the panel based on the regenerated backoff count value. A manner of doubling the contention window is similar to the doubling manner shown in FIG. 3a, and details are not described again.

In a possible implementation, if the network device has a larger quantity of panels, one backoff counter is set for each panel, and an independent backoff process is maintained for each panel, an entire backoff process is relatively complex, and processing load of the network device is increased. Therefore, to simplify a backoff process, the plurality of panels may be first divided into a plurality of panel groups.

Figure 13:
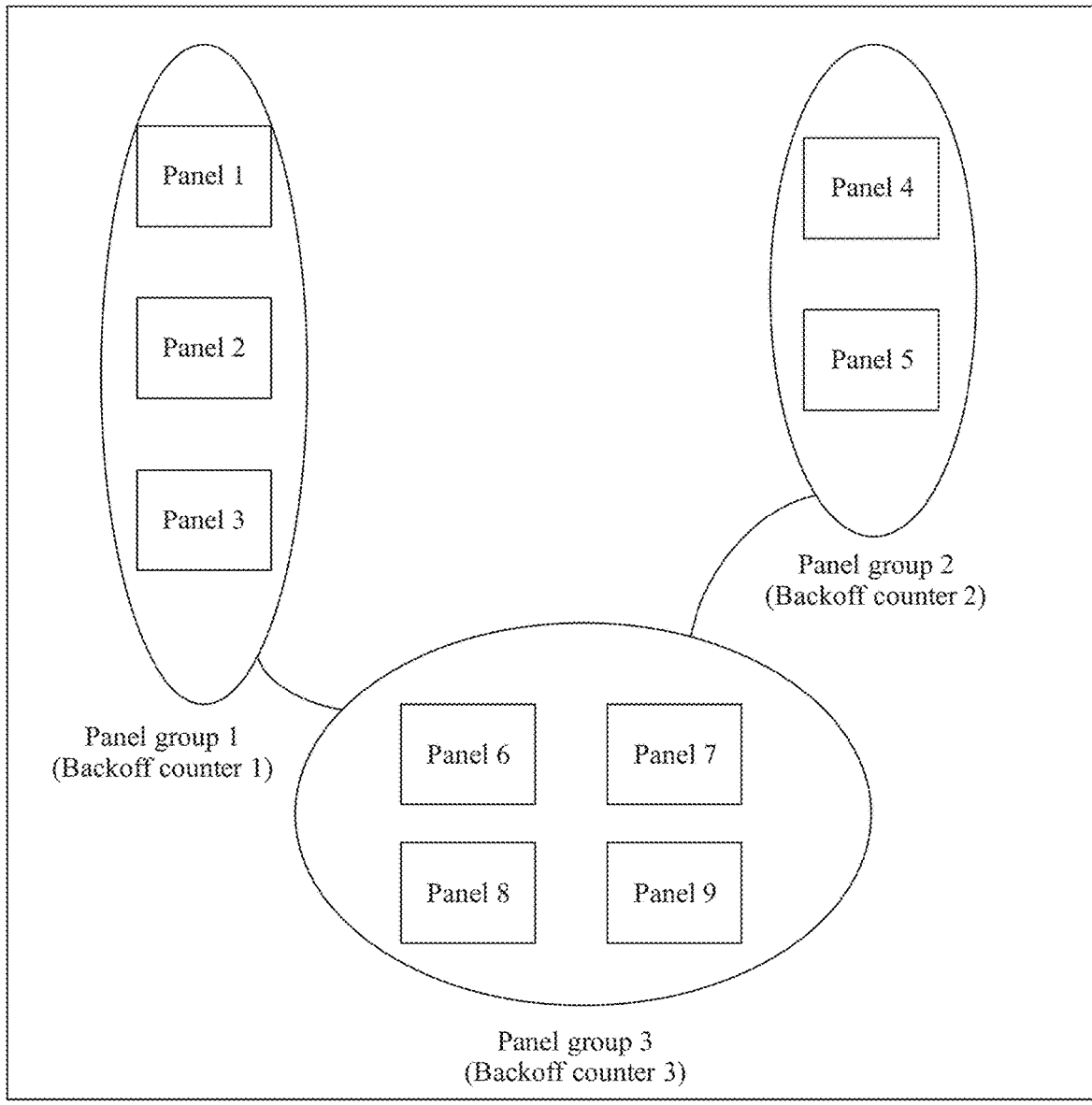
FIG. 13 is a schematic diagram of grouping a plurality of panels according to an embodiment of this application.

For example, the plurality of panels may be grouped based on relative distances between the panels, and panels relatively close to each other are grouped into one panel group. As shown in FIG. 13, the panel 1, the panel 2, and the panel 3 are relatively close to each other. Therefore, the panel 1, the panel 2, and the panel 3 are grouped into a panel group 1. Similarly, a panel 4 and a panel 5 are grouped into a panel group 2, and a panel 6, a panel 7, a panel 8, and a panel 9 are grouped into a panel group 3.

Further, after the panels are grouped, each panel group may be equivalent to a panel. One backoff counter is set for each panel group, and an independent backoff process is maintained for each panel group. Then, a channel state is detected through each panel group. If it is detected, within an XIFS, that the channel remains idle, a backoff count value is randomly selected from a contention window of the panel group, and a backoff process of the panel group is maintained based on the backoff count value.

An implementation of detecting the channel state through each panel group and determining whether the channel is busy or idle is described in detail below, and is not described herein.

If a backoff count value of a first panel group in the plurality of panel groups backs off to zero, it is determined that the first panel group obtains permission to use the channel. This is equivalent to that each panel in the panel group obtains permission to use the channel. The network device may send the frame through one or more panels in the first panel group. For panel groups whose backoff value do not back off to zero in the plurality of panel groups, in a manner similar to the foregoing processing manner used when the panels are not grouped, a backoff process of each panel group may be suspended, and a backoff count value and a contention window of each panel group may be retained. Alternatively, the backoff count value of each panel group is reset, and the contention window of each panel group is retained or reset.

In a possible implementation, if the backoff count value of the first panel group in the plurality of panel groups backs off to zero, it may be further determined whether there is a candidate panel group that meets a preset condition. The candidate panel group is one or more panel groups that meet the preset condition in all of the plurality of panel groups except the first panel group. The preset condition is detecting, through the panel group, that the channel remains idle in a preset time period. The preset time period is a time period before a current moment. The current moment is a moment at which the backoff count value of the first panel group backs off to zero. If there is a candidate panel group that meets the preset condition, it is equivalent that the candidate panel group also obtains permission to use the channel. In other words, each panel in the candidate panel group obtains permission to use the channel. Therefore, the network device may send the frame through one or more panels in the first panel group, or may send the frame through one or more panels in each candidate panel group, or may send the frame through one or more panels in the first panel group and all panels corresponding to all candidate panel groups that meet the condition.

The preset time period may be a DIFS, a PIFS, an SIFS, or another value.

Further, for a panel group that does not meet the preset condition in all panel groups of the plurality of panel groups except the first panel group, when the backoff count value of the first panel group backs off to zero, a backoff process of the panel group may be suspended, and a contention window and a backoff count value of the panel group are retained. For a candidate panel group that meets the preset condition, if a panel in the candidate panel group sends the frame, a backoff process of the candidate panel group does not need to be suspended, and the backoff process of the panel group needs to be reset after the panel in the candidate panel group sends the frame. If the candidate panel group is not used to send the frame, the backoff process of the candidate panel group needs to be suspended, and a contention window and a backoff count value of the candidate panel group are retained. In addition, for the first panel group, because the backoff count value of the first panel backs off to zero, it indicates that network device obtains, through contention, permission to use the channel. Therefore, whether the network device uses the panel in the first panel group to send the frame or not, to ensure that another conventional device can obtain, through contention, permission to use the channel, the backoff process of the first panel group needs to be reset after the network device sends the frame.

In a possible implementation, if a backoff count value of any one of the plurality of panel groups does not back off to zero, and it is detected, through the panel group, that the channel is idle in a current slot, the backoff count value of the panel group is decreased by 1. In addition, when it is detected, through the panel group, that the channel is busy in the current slot, a backoff process of the panel group is suspended, and the backoff count value and a backoff window of the panel group are retained.

In a possible implementation, for a panel group that obtains permission to use the channel, when the network device sends the frame through a panel in the panel group, if sending fails, a contention window of the panel group is doubled. For a doubling manner, refer to the description shown in FIG. 3a, and details are not described again. Then, a new backoff count value is regenerated for the panel group based on the doubled contention window, and a new backoff process is maintained for the panel group based on the new backoff count value.

Figure 14:
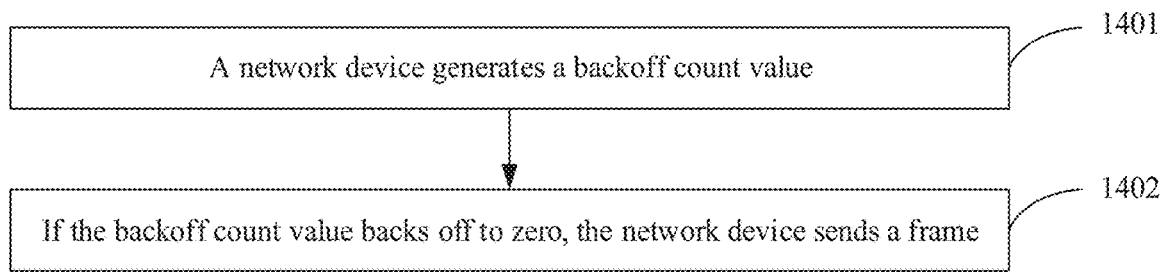
FIG. 14 is a schematic flowchart of another channel access method according to an embodiment of this application.

FIG. 14 is a schematic flowchart of another channel access method according to an embodiment of this application. The method is applied to the network device shown in FIG. 5. The network device may be a network side device, or may be a terminal device. The method in this embodiment includes the following steps.

1401: The network device generates a backoff count value.

If the network device needs to use a channel resource at a current moment, the network device listens to a channel to obtain permission to use the channel.

Specifically, one backoff counter is set for a plurality of panels of the network device. In other words, the plurality of panels share one backoff counter. Then, the network device listens to the channel within an XIFS. If the network device learns through listening that the channel remains idle, the network device randomly selects a backoff count value in a CW of the backoff counter, and performs backoff based on the backoff count value.

Because only one backoff count value is set, a first panel that is in the plurality of panels and that corresponds to the backoff count value may be considered as a primary panel, and another panel may be considered as a secondary panel. In other words, it may be considered that only one backoff process is maintained for the primary panel, to maintain a backoff process for another panel.

In addition, the network device may listen to the channel through the plurality of panels, and the plurality of panels have different channel state listening results. However, only one backoff process is maintained for the primary panel. In this case, for how to determine a channel state, this application specially provides the following two channel listening methods to determine whether a channel is idle.

Method 1:

Listening to a channel through the first panel in the XIFS; if it is detected, in the XIFS, that the channel remains idle, determine that the channel remains idle in the XIFS: and randomly select a backoff count value and perform backoff based on the backoff count value.

Method 2:

Listening to a channel through each panel, to obtain a listening result of each panel; determine, based on listening results of some or all of the plurality of panels, whether the channel is idle; if it is determined, based on the listening results of some or all of the plurality of panels, that the channel remains idle within the XIFS, determine that the channel remains idle within the XIFS; and randomly select a backoff count value and perform backoff based on the backoff count value.

Specifically, an average value of the listening results of the plurality of panels may be obtained, and the channel state is determined based on the average value. Alternatively, if a quantity of panels indicating that the channel is idle in the listening results of the plurality of panels reaches a threshold, it may be considered that the channel is idle. Otherwise, it is determined that the channel is busy.

For example, when channel listening is performed on a physical carrier, a signal strength indicator (Received Signal Strength Indicator, RSSI) of a channel is obtained through each panel. Then, an average value of RSSIs of the plurality of panels is obtained, and the channel state is determined based on the average value. Alternatively, a listening result of the channel through each panel is determined based on the RSSI of each panel. If the quantity of panels indicating that the channel is idle in the listening result reaches the threshold, it may be considered that the channel is idle. Otherwise, it is determined that the channel is busy.

In addition, it should be noted that a manner in which the network device listens to the channel in the backoff process to determine whether the channel is idle is also implemented by using the foregoing method 1 or method 2. Details are not described again.

1402: If the backoff count value backs off to zero, the network device sends a frame.

If the backoff count value backs off to zero, the network device determines that permission to use the channel is obtained, and sends the frame.

It can be learned that one backoff counter is set for the plurality of panels of the network device, and if the network device contends for permission to use the channel, one backoff process is maintained for the primary panel of the plurality of panels. If the backoff count value backs off to zero, it is determined that the network device obtains permission to use the channel. In this case, the network device may access the channel, so that network device can successfully access the channel when the plurality of panels sense different channel states. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

If the backoff count value backs off to zero, it indicates that the network device detects, in a current slot, that the channel is idle. Therefore, when the first panel is used to determine the channel state of the channel, it may be determined that the first panel indeed has permission to use the channel at a moment at which the backoff count value backs off to zero, and there is no need to consider whether the first panel satisfies a preset condition.

Further, after it is determined that the first panel has permission to use the channel, it further needs to be determined whether there is a candidate panel meeting the preset condition in the secondary panels.

The candidate panel is one or more panels that meet the preset condition in all panels of the plurality of panels except the first panel. The preset condition is detecting, through the panel in a preset time period, that the channel remains idle. The preset time period is a time period before a current moment. The current moment is a moment at which the backoff count value of the first panel backs off to zero. If there is a candidate panel that meets the condition, the candidate panel is equivalent to obtaining permission to use the channel, and the network device may send the frame through the first panel and/or the candidate panel. In other words, if there is the candidate panel, the network device may send the frame through the first panel and one or more of all panels corresponding to all candidate panels that meet the preset condition.

The preset time period may be a DIFS, a PIFS, an SIFS, or another value.

It should be noted that because the backoff count value of the first panel backs off to zero, regardless of whether the first panel is used to send the frame, the network device needs to reset the backoff process of the first panel after sending the frame. This ensures that another conventional device can contend for permission to use the channel, and ensure fairness of contending for the channel.

Figure 15:
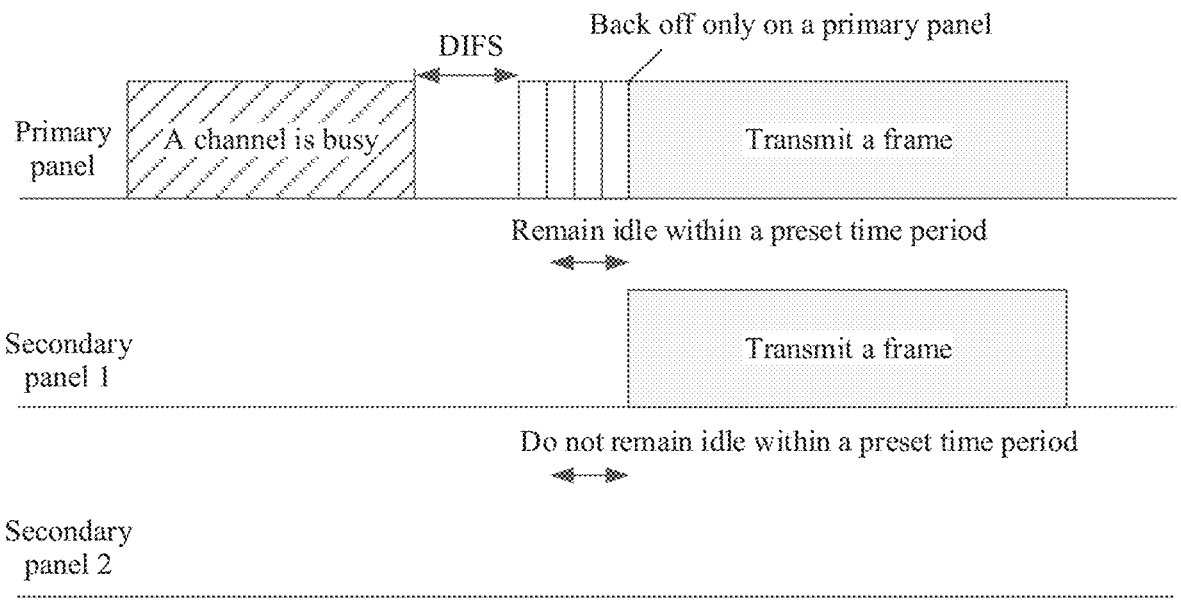
FIG. 15 is a schematic diagram of still another backoff process of a network device according to an embodiment of this application.

As shown in FIG. 15, because the backoff counter is set only for the primary panel, in a backoff process of the network device, backoff is performed only on the primary panel, but not on a secondary panel. If the backoff count value of the primary panel backs off to zero, it is determined that a secondary panel 1 meets the preset condition (FIG. 15 shows only a case in which the secondary panel 1 meets the preset condition, and in actual application, there may be a plurality of secondary panels that meet the preset condition). Therefore, the network device may send the frame through the primary panel and/or the secondary panel 1.

In addition, when the channel is detected through the plurality of panels, and the channel state is determined based on the listening results of some or all of the plurality of panels, if the network device detects, in the current slot, that the channel is idle, it cannot indicate that the network device listens to, through the first panel, that the channel is idle. In this case, it is very likely that the first panel is used to detect that the channel is busy. Therefore, if the channel state is listened to through a plurality of panels, and if the backoff count value of the first panel backs off to zero, it only indicates that the network device obtains permission to use the channel, but does not indicate that the first panel obtains permission to use the channel. Because at this moment the first panel may detect that the channel is busy. Therefore, when the backoff count value of the first panel backs off to zero, if it is directly determined that the first panel obtains permission to use the channel, the frame is sent through the first panel, because the first panel detects that the channel is busy, a sending collision occurs, and sending fails.

Therefore, if the channel state is listened to through the plurality of panels, and the backoff count value of the first panel backs off to zero, a candidate panel that meets the preset condition in the plurality of panels (including the first panel) needs to be determined, and then a frame is sent through the candidate panel.

Therefore, if it is detected, through the first panel, that the channel remains idle within the preset time period, the first panel may be used as a candidate panel. If it is detected, through the first panel, that the channel does not remain idle within the preset time period, even if the backoff count value of the first panel backs off to zero, the first panel cannot be used as a candidate panel. In other words, the first panel cannot be used to send the frame.

Figure 16:
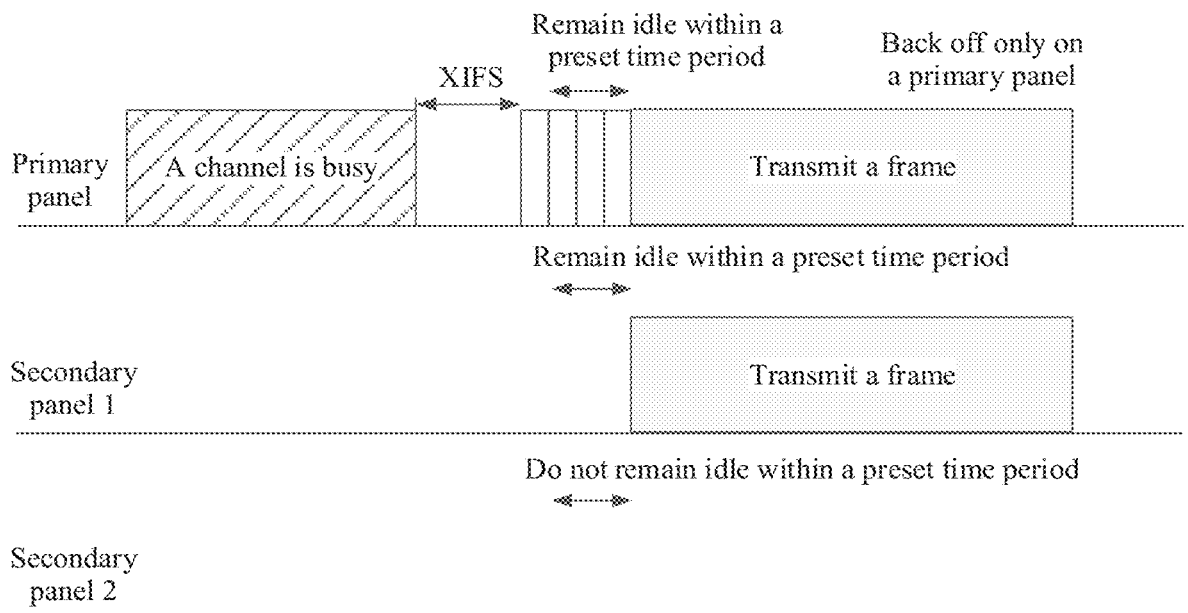
FIG. 16 is a schematic diagram of yet another backoff process of a network device according to an embodiment of this application.

As shown in FIG. 16, the backoff count value of the primary panel backs off to zero. If it is determined that the secondary panel 1 meets the preset condition, and a primary panel also meets the preset condition, both the primary panel and the secondary panel 1 may be used as candidate panels, and are used to send the frame.

In a possible implementation, when it is detected, in the current slot, that the channel is idle, the backoff count value is decreased by 1. When it is detected, in the current slot, that the channel is busy, a backoff process of the first panel is suspended if the backoff count value does not back off to zero, and a backoff count value and a contention window of the first panel is retained.

The network device may listen to the channel in the current slot, to determine whether the channel is idle in a listening manner similar to that in the foregoing method 1 or method 2. Details are not described again.

In a possible implementation, when the network device obtains permission to use the channel, and sends the frame through the panel. If sending fails, a CW of the backoff counter is doubled. For a doubling manner, refer to the content shown in FIG. 3a. Details are not described again. Then, the backoff count value of the primary panel is regenerated based on the doubled contention window, and a new backoff process is maintained for the primary panel based on the regenerated backoff count value.

In a possible implementation, if the network device has a larger quantity of panels, even if one backoff counter is set for the plurality of panels to perform backoff, a candidate panel that meets the preset condition still needs to be determined from the plurality of panels. An entire channel access process is relatively complex, and processing load of network devices is increased. Therefore, to simplify the channel access process, the plurality of panels may be first divided into a plurality of panel groups.

For example, the plurality of panels may be grouped based on relative distances between the panels, and panels with relatively close distances are grouped into one panel group. As shown in FIG. 13, the panel 1, the panel 2, and the panel 3 are relatively close to each other. Therefore, the panel 1, the panel 2, and the panel 3 are grouped into a panel group 1. Similarly, a panel 4 and a panel 5 are grouped into a panel group 2, and a panel 6, a panel 7, a panel 8, and a panel 9 are grouped into a panel group 3.

Further, after the panel groups are divided, only one backoff counter is set for a first panel group in the plurality of panel groups. Therefore, the first panel group may also be referred to as a primary panel group, and other panel groups may be referred to as secondary panel groups. Then, each panel group is equivalent to a panel, and channel listening is performed in the channel listening manner in the foregoing method 1 or method 2, to determine a channel state. If it is detected within the XIFS that the channel remains idle, a backoff count value is randomly generated, and a backoff process of the first panel group is maintained based on the backoff count value.

If the backoff count value backs off to zero, it indicates that the network device obtains permission to use the channel, and it indicates that the network device detects, in the current slot, that the channel is idle. Therefore, if the first panel group is used to listen to the channel and determine the channel state, at a moment at which the backoff count value of the first panel group backs off to zero, the network device may determine that the first panel group indeed has permission to use the channel. Therefore, there is no need to consider whether the first panel group meets the preset condition.

Further, after it is determined that the first panel group has permission to use the channel, it further needs to determine whether there is a candidate panel group that meets the preset condition.

The candidate panel group is one or more panel groups that meet the preset condition in all panel groups of the plurality of panel groups except the first panel group. The preset condition is detecting, through the panel group in a preset time period, that the channel remains idle. The preset time period is a time period before a current moment. The current moment is a moment at which the backoff count value of the first panel group backs off to zero. If there is a candidate panel group that meets the condition, the candidate panel group obtains permission to use the channel. In this case, the network device may send the frame through one or more panels in the first panel group, or may send the frame through one or more panels in each candidate panel group, or may send the frame through one or more panels in all panel groups corresponding to the first panel group and the candidate panel group.

The preset time period may be a DIFS, a PIFS, an SIFS, or another value.

It should be noted that because the backoff count value of the first panel group backs off to zero, regardless of whether a panel in the first panel is used to send the frame, the network device needs to reset the backoff process of the first panel group after sending the frame. This ensures that another conventional device can contend for permission to use the channel, and ensure fairness of contending for the channel.

In addition, if the channel is listened to through a plurality of panel groups, and the channel state is determined based on listening results of some or all of the plurality of panel groups, that the network device detects that the channel is idle in the current slot cannot indicate that the network device detects that the channel is idle through the first panel group. In this case, it is very likely that the first panel group is used to detect that a channel is busy. Therefore, if the channel is listened to through a plurality of panel groups, if the backoff count value of the first panel group backs off to zero, it only indicates that the network device obtains permission to use the channel, but does not indicate that the first panel group obtains permission to use the channel. Therefore, when the backoff count value of the first panel group backs off to zero, if it is directly determined that the first panel group obtains permission to use the channel, the frame is sent through one or more panels in the first panel group. Because the first panel group essentially detects that the channel is busy, a sending collision occurs, and sending fails.

Therefore, if the channel is listened to through a plurality of panel groups, and at a moment at which the backoff count value of the first panel group backs off to zero, a candidate panel group that meets the preset condition in the plurality of panel groups (including the first panel group) needs to be determined, and then a frame is sent through one or more panels in the candidate panel group. Therefore, if it is detected, through the first panel group, that the channel remains idle within the preset time period, the first panel may be used as the candidate panel. If it is detected, through the first panel group, that the channel does not remain idle within the preset time period, even if the backoff count value of the first panel group backs off to zero, the first panel group cannot be used as the candidate panel, that is, no panel in the first panel group can be used to send the frame.

The listening to a channel through any panel group may be: listening to the channel through any panel in the panel group, and determining the channel state based on a listening result of the panel, or determining the channel state in the sensing manner in the foregoing method 2.

In a possible implementation, if the backoff count value of the first panel group does not back off to zero, and it is detected, in the current slot, that the channel is idle, the backoff count value is decreased by 1. When it is detected, in the current slot, that the channel is busy, a backoff process of the first panel is suspended, and a backoff count value and a contention window of the first panel is retained.

The network device may listen to the channel state in the current slot, to determine whether the channel is idle in a listening manner similar to that in the foregoing method 1 or method 2. Details are not described again.

In a possible implementation, when the network device obtains permission to use the channel, and sends the frame through the panel. If sending fails, a CW of the backoff counter is doubled. For a doubling manner, refer to the content shown in FIG. 3a. Details are not described herein again. Then, the backoff count value of the primary panel group is regenerated based on the doubled contention window, and a new backoff process is maintained for the primary panel group based on the regenerated backoff count value.

It should be noted that, in all the foregoing embodiments, determining whether a channel is idle by panel listening is comprehensively determining, by using a physical carrier sense channel and a virtual carrier sensing channel, whether the channel is idle. Specifically, when listening is performed by using a physical carrier, an RSSI of a channel may be obtained through a panel, and whether the channel is idle is determined based on the RSSI. If the channel is detected by using a virtual carrier, a MAC frame may be obtained through the panel, and whether the channel is idle is determined based on predetermined information carried in a Duration field of a MAC frame header. If it is detected, by using both a physical carrier and a virtual carrier, that the channel is idle, the channel is determined to be idle. Otherwise, the channel is determined to be busy.

The foregoing embodiment describes a process of performing backoff and accessing a channel on the physical carrier. However, in addition to accessing the channel on the physical carrier, a multi-panel device further needs to access the channel on the virtual carrier. How to set an NAV of the multi-panel device needs to be considered for accessing the channel on the virtual carrier. The following describes how to set the NAV of the multi-panel device by using the following implementations.

First, an application scenario in which the NAV of the multi-panel device is set is described in embodiments of this application.

The network device serves a STA. In other words, the STA may receive scheduling of the network device.

The network device is the multi-panel device. For the STA, there are one or more service panels of a plurality of panels of the network device, that is, one or more primary panels associated with the STA. A panel other than the one or more service panels in the plurality of panels is referred to as a non-service panel. The plurality of panels are located at a same BSS (which may also be referred to as a cell), that is, a BSS corresponding to the network device.

In addition, this application is described by using an example in which the STA is a single-panel device.

The NAV of the STA includes an Intra-BSS NAV and a Basic NAV, and an NAV of each panel of the network device includes an Intra-BSS NAV and a Basic NAV.

Figure 17:
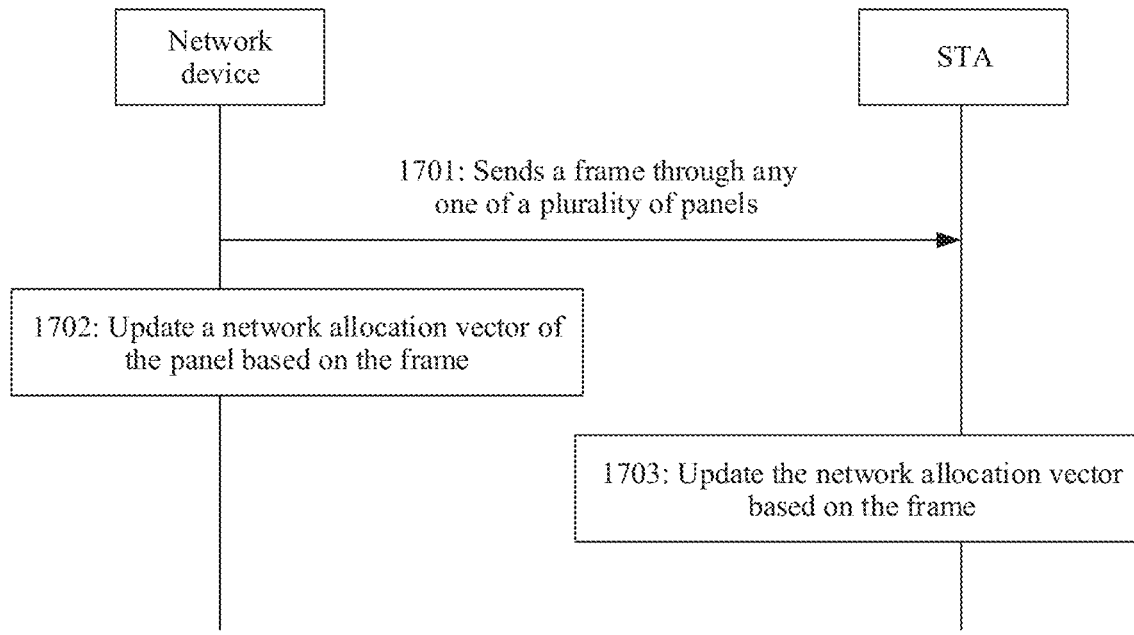
FIG. 17 is a schematic flowchart of an NAV setting method for a multi-panel device according to an embodiment of this application.

FIG. 17 is a schematic flowchart of an NAV setting method for a multi-panel device according to an embodiment of this application. The method in this embodiment includes the following steps.

1701: A network device sends a frame to a STA through any one of a plurality of panels.

1702: The network device updates a network allocation vector of the panel based on the frame.

Specifically, the network device parses predetermined information carried in a Duration field in a frame header of the frame, determines, based on the predetermined information, duration for which the panel occupies a channel, and updates an Intra-BSS NAV or a Basic NAV of the panel based on the duration.

1703: The STA updates the network allocation vector based on the frame.

In addition, if the network device receives, through the any panel, the frame sent by a STA, the network device also needs to update the Intra-BSS NAV or the Basic NAV of the panel based on the frame, that is, update the Intra-BSS NAV or the Basic NAV of the panel based on duration for which the STA occupies the channel.

It can be learned that the STA updates the network allocation vector of the STA based on the frame sent by an AP (a multi-panel device), to know when the STA has permission to use the channel, thereby avoiding a conflict with the AP when accessing the channel on a virtual carrier. In addition, when receiving, through the any panel, the frame sent by the STA or sending the frame to the STA, the AP updates the network allocation vector of the panel based on the received frame or the sent frame, so that the AP knows when the panel has permission to use the channel and the duration of occupying the channel. In this way, a conflict with another device is avoided when information is transmitted through the panel, and a channel is successfully accessed on the virtual carrier.

Figure 18:
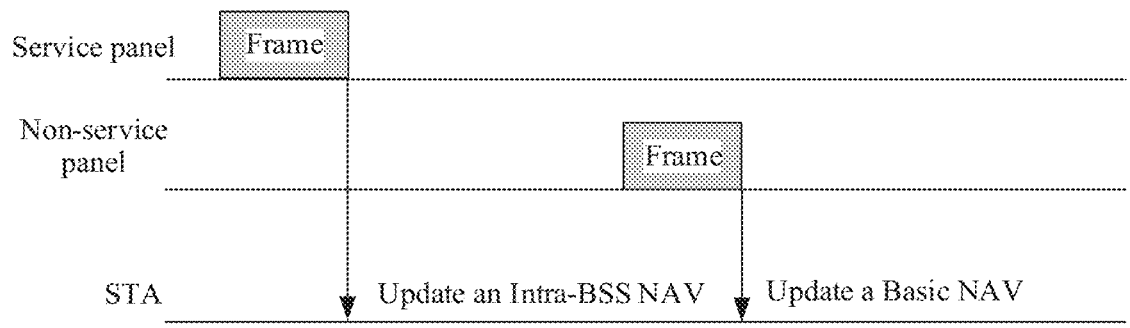
FIG. 18 is a schematic diagram of updating an NAV according to an embodiment of this application.

Optionally, the STA first determines a type of the panel. As shown in FIG. 18, if it is determined that the panel is a service panel, the Intra-BSS NAV of the STA is updated based on the frame. In other words, the predetermined information carried in the Duration field in the frame header of the frame is parsed. The duration for which the panel occupies the channel is determined based on the predetermined information, and the Intra-BSS NAV of the STA is updated based on the occupation duration. If it is determined that the panel is a non-service panel, the Basic NAV of the STA is updated based on the occupation duration. Therefore, the STA classifies a frame that is from the BSS at which the STA is located but belongs to the non-service panel as a frame from another BSS, to update the Basic NAV of the STA.

In some cases, when the Intra-BSS NAV of the STA is zero, but the Basic NAV is not zero, the STA may still perform information transmission with another AP or STA in the BSS at which the STA is located. Therefore, when the STA receives a frame from another BSS (the frame from the another BSS may be a frame sent by the non-service panel of the AP), only the basic NAV of the STA is updated, thereby increasing a possibility that the intra-BSS NAV of the STA is zero. Therefore, after the Basic NAV of the STA is updated, that is, when the Basic NAV is not zero, the STA can still perform information transmission, so that the STA can further perform information transmission with another panel of the AP while receiving a frame sent by the non-serving panel of the AP, this facilitates spatial multiplexing between a plurality of panels and improves scheduling flexibility.

Figure 19:
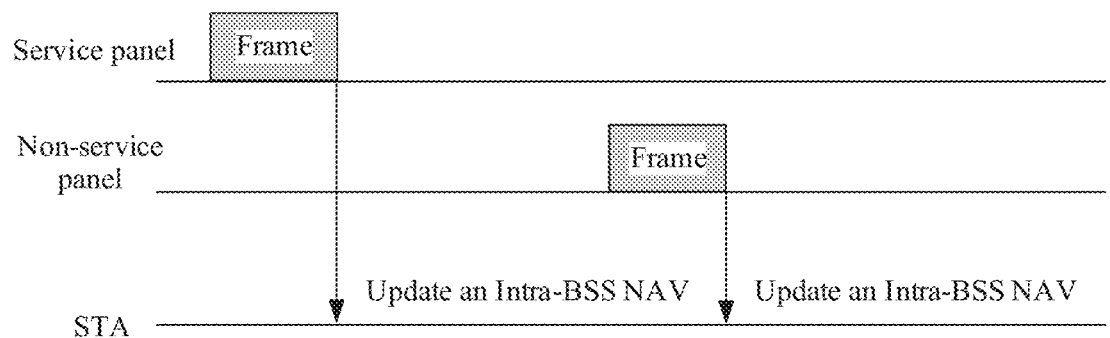
FIG. 19 is another schematic diagram of updating an NAV according to an embodiment of this application.

Optionally, the STA may not need to determine a type of a panel. As shown in FIG. 19, when receiving a frame sent by the network device, regardless of whether the frame is from a service panel or a non-service panel, the STA uses the frame as a frame from a BSS in which the STA is located. Then, the Intra-BSS NAV of the STA is updated based on the channel occupancy duration corresponding to the frame.

Figure 20:
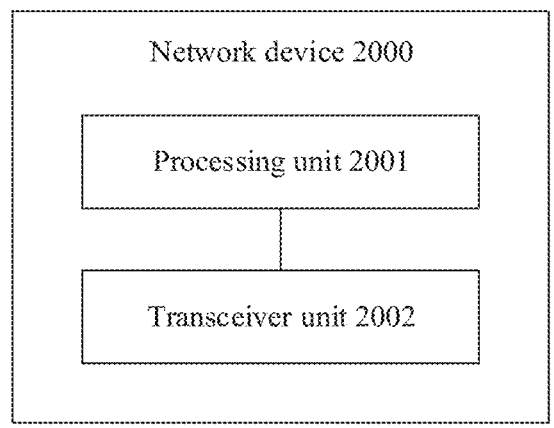
FIG. 20 is a schematic diagram of a structure of a network device according to an embodiment of this application.

FIG. 20 is a schematic diagram of a structure of a network device according to an embodiment of this application. A network device 2000 includes a processing unit 2001 and a transceiver unit 2002. The transceiver unit 2002 includes a plurality of panels.

The processing unit 2001 is configured to generate a backoff count value of each of the plurality of panels.

The transceiver unit 2002 is configured to send a frame if a backoff count value of any one of the plurality of panels backs off to zero.

It can be learned that one backoff count value is generated for each of the plurality of panels of the network device, so that each panel independently performs backoff. If a backoff count value of any panel backs off to zero, it is determined that the network device obtains permission to use a channel. In this case, the network device may send the frame, to successfully access the channel when the plurality of panels sense different channel states. Because the network device successfully accesses the channel, the network device (multi-panel device) may be used to send the frame, thereby increasing a spatial flow, improving a throughput during information transmission, and further improving information transmission efficiency.

In a possible implementation, the transceiver unit 2002 is configured to send the frame through a first panel, and the first panel is the panel whose backoff count value is zero in the plurality of panels.

The processing unit 2001 is further configured to suspend a backoff process of each panel in all panels except the first panel in the plurality of panels, and retain a backoff count value and a contention window of each panel.

In a possible implementation, the transceiver unit 2002 is configured to send the frame through the first panel, and the first panel is the panel whose backoff count value is zero in the plurality of panels.

The processing unit 2001 is further configured to suspend a backoff process of each panel in all panels except the first panel in the plurality of panels, reset a backoff count value of each panel, and retain or reset a contention window of each panel.

In a possible implementation, the transceiver unit 2002 is configured to send the frame through the first panel and/or a candidate panel. The first panel is a panel whose backoff count value is zero in the plurality of panels. The candidate panel is one or more panels that meet a preset condition in all panels except the first panel in the plurality of panels. The preset condition is detecting, through a panel, that the channel remains idle within a preset time period. The preset time period is a time period before a time point at which the backoff count value of the first panel backs off to zero.

The processing unit 2001 is further configured to: suspend a backoff process of each panel in all panels except the first panel in the plurality of panels, and retain a backoff count value and a contention window of each panel; or suspend a backoff process of each panel in all panels except the first panel and the candidate panel in the plurality of panels, and retain a backoff count value and a contention window of each panel.

Alternatively, the transceiver unit 2002 is configured to send the frame through the first panel if no panel meets the preset condition in all panels except the first panel in the plurality of panels.

The processing unit 2001 is further configured to suspend a backoff process of each panel in all panels except the first panel in the plurality of panels, and retain a backoff count value and a contention window of each panel.

In a possible implementation, the transceiver unit 2002 is configured to send the frame through the first panel and/or a candidate panel. The first panel is a panel whose backoff count value is zero in the plurality of panels. The candidate panel is one or more panels that meet a preset condition in all panels except the first panel in the plurality of panels. The preset condition is detecting, through a panel, that the channel remains idle within a preset time period. The preset time period is a time period before a time point at which the backoff count value of the first panel backs off to zero.

The processing unit 2001 is further configured to: suspend a backoff process of each panel in all panels except the first panel in the plurality of panels, reset a backoff count value of each panel, and retain or reset a contention window of each panel; or suspend a backoff process of each panel in all panels except the first panel and the candidate panel in the plurality of panels, reset the backoff count value and the contention window of each panel, and retain or reset the contention window of each panel.

Alternatively, the transceiver unit 2002 is configured to send the frame through the first panel if no panel meets the preset condition in all panels except the first panel in the plurality of panels.

The processing unit 2001 is further configured to suspend a backoff process of each panel in all panels except the first panel in the plurality of panels, reset a backoff count value of each panel, and retain or reset a contention window of each panel.

In a possible implementation, the processing unit 2001 is further configured to: if the backoff count value of the any one of the plurality of panels is not zero and when detecting, through the panel, that a channel is idle in a current slot, subtract one from the backoff count value of the panel, and when detecting, through the panel, that the channel is busy in the current slot, suspend a backoff process of the panel and retain a backoff count value and a contention window of the panel.

The network device 2000 may be a chip. The processing unit 2001 may be a processing circuit in the chip, and the transceiver unit 2002 may be a communication interface circuit in the chip. Optionally, the chip may further be coupled to a storage unit. When the chip reads instructions in the storage unit, the foregoing channel access method may be implemented.

Figure 21:
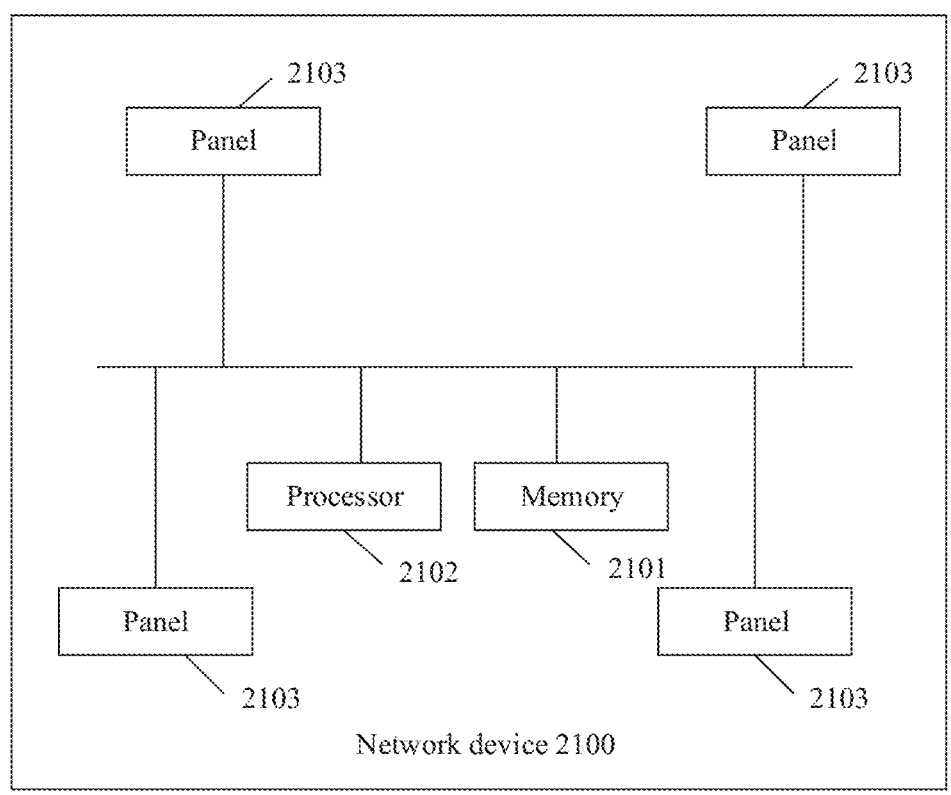
FIG. 21 is a schematic diagram of a structure of another network device according to an embodiment of this application.

FIG. 21 is a schematic diagram of a structure of another network device according to an embodiment of this application. A network device 2100 includes a memory 2101, a processor 2102, and a plurality of panels 2103, where the processor 2102 corresponds to the plurality of panels 2103. The memory 2101 is configured to store related instructions and data, and may transmit the stored data to the processor 2102.

The processor 2102 is configured to read the related instructions in the memory 2101, and perform the following operations:

generating a backoff count value for each of the plurality of panels; and sending a frame through a panel if a backoff count value of any one of the plurality of panels backs off to zero.

It can be learned that one backoff count value is generated for each of the plurality of panels of the network device, so that each panel independently performs backoff. If a backoff count value of any panel backs off to zero, it is determined that the network device obtains permission to use a channel. In this case, the network device may send the frame, to successfully access the channel w % ben the plurality of panels sense different channel states. Because the network device successfully accesses the channel, the network device (multi-panel device) may be used to send the frame, thereby increasing a spatial flow, improving a throughput during information transmission, and further improving information transmission efficiency.

It should be understood that, the processor 2102 mentioned in embodiments of this application may be a central processing unit (Central Processing Unit, CPU), or may be another general-purpose processor, a digital signal processor (Digital Signal Processor. DSP), an application-specific integrated circuit (Application Specific Integrated Circuit, ASIC), or a field programmable gate array (Field Programmable Gate Array, FPGA), or another programmable logic device, discrete gate, transistor logic device, discrete hardware component, or the like. The general-purpose processor may be a microprocessor, or the processor may further be any conventional processor, or the like.

The memory 2101 stores computer instructions and data. The memory 2101 may store computer instructions and data that are required for implementing the channel access method provided in this application. For example, the memory 2101 stores instructions used to implement steps of the channel access method. The memory 2101 may be any one or any combination of the following storage media: a nonvolatile memory (for example, a read-only memory (ROM), a solid state drive (SSD), a hard disk (HDD), or a compact disc) and a volatile memory.

Specifically, the processor 2102 of the network device 2100 may be the processing unit 2001 of the network device 2000 in the embodiment shown in FIG. 20, and the panel 2103 of the network device 2100 may be the transceiver unit 2002 of the network device 2000 in the embodiment shown in FIG. 20.

Figure 22:
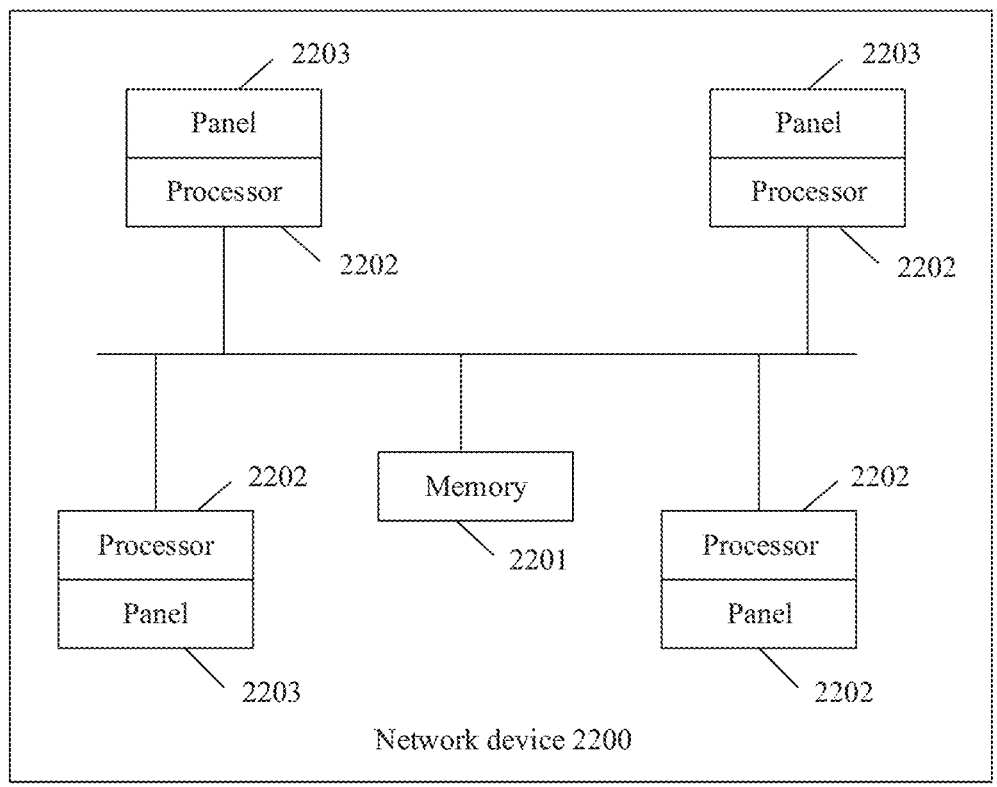
FIG. 22 is a schematic diagram of a structure of still another network device according to an embodiment of this application.

FIG. 22 is a schematic diagram of a structure of still another network device according to an embodiment of this application. A network device 2200 includes a memory 2201, a plurality of processors 2202, and a plurality of panels 2203, where each processor 2202 corresponds to one or more panels 2203 (FIG. 22 shows only a case in which each processor 2202 corresponds to one panel 2203). The memory 2201 is configured to store related instructions and data, and may transmit the stored data to the processor 2202.

The processor 2202 is configured to read the related instructions in the memory 2201, and perform the following operations:

generating a backoff count value for each of the plurality of panels; and sending a frame through the panel if a backoff count value of any one of the plurality of panels backs off to zero.

It can be learned that one backoff count value is generated for each of the plurality of panels of the network device, so that each panel independently performs backoff. If a backoff count value of any panel backs off to zero, it is determined that the network device obtains permission to use a channel. In this case, the network device may send the frame, to successfully access the channel when the plurality of panels sense different channel states. Because the network device successfully accesses the channel, the network device (multi-panel device) may be used to send the frame, thereby increasing a spatial flow, improving a throughput during information transmission, and further improving information transmission efficiency.

It should be understood that, the processor 2202 mentioned in embodiments of this application may be a central processing unit (Central Processing Unit, CPU), or may be another general-purpose processor, a digital signal processor (Digital Signal Processor, DSP), an application-specific integrated circuit (Application Specific Integrated Circuit, ASIC), or a field programmable gate array (Field Programmable Gate Array, FPGA), or another programmable logic device, discrete gate, transistor logic device, discrete hardware component, or the like. The general-purpose processor may be a microprocessor, or the processor may further be any conventional processor, or the like.

The memory 2201 stores computer instructions and data. The memory 2201 may store computer instructions and data that are required for implementing the channel access method provided in this application. For example, the memory 2201 stores instructions used to implement steps of the channel access method. The memory 2201 may be any one or any combination of the following storage media: a nonvolatile memory (for example, a read-only memory (ROM), a solid state drive (SSD), a hard disk (HDD), or a compact disc) and a volatile memory.

Specifically, the processor 2202 of the network device 2200 may be the processing unit 2001 of the network device 2000 in the embodiment shown in FIG. 20, and the panel 2203 of the network device 2200 may be the transceiver unit 2002 of the network device 2000 in the embodiment shown in FIG. 20.

It should be noted that FIG. 22 shows only a case in which one processor corresponds to one panel. In another case, in the network device 2200, one processor may correspond to a plurality of panels. For example, the plurality of processors included in the network device include at least one first processor and at least one second processor. One first processor corresponds to one panel, and one second processor corresponds to a plurality of panels. For another example, the network device includes a plurality of processors, and each of the plurality of processors corresponds to a plurality of panels.

Figure 23:
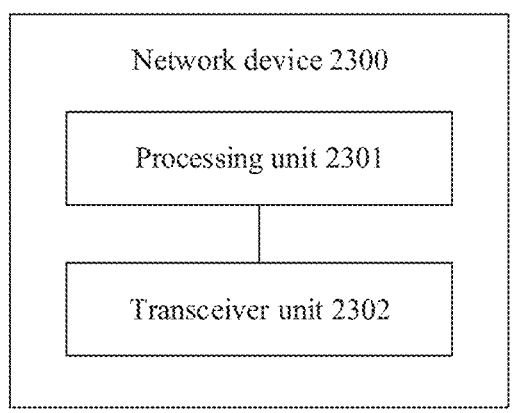
FIG. 23 is a schematic diagram of a structure of a network device according to an embodiment of this application.

FIG. 23 is a schematic diagram of a structure of a network device according to an embodiment of this application. A network device 2300 includes a processing unit 2301 and a transceiver unit 2302, and the transceiver unit 2302 includes a plurality of panels.

The processing unit 2301 is configured to generate a backoff count value.

The transceiver unit 2302 is configured to send a frame if the backoff count value backs off to zero.

It can be learned that one backoff counter is set for the plurality of panels of the network device, and if the network device contends for permission to use a channel, one backoff process is maintained for the plurality of panels. If the backoff count value backs off to zero, it is determined that the network device obtains permission to use the channel. In this case, the network device may access the channel, so that the network device can successfully access the channel when sensing of channel states by the plurality of panels are different. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

In a possible implementation, the processing unit 2301 is further configured to: before generating the backoff count value, detect, through a first panel, whether the channel is idle, where the first panel is a panel corresponding to the backoff count value in the plurality of panels.

In a possible implementation, the transceiver unit 2302 is configured to send a frame through the first panel and/or a candidate panel, where the candidate panel is one or more panels that meet a preset condition in all panels except the first panel in the plurality of panels. The preset condition is detecting, through the panel, that a channel remains idle within a preset time period. The preset time period is a time period before a time point at which the backoff count value of the first panel backs off to zero.

In a possible implementation, the processing unit 2301 is further configured to: before generating the backoff count value, detect the channel through each of the plurality of panels; and determine, based on listening results of some or all of the plurality of panels, whether the channel is idle.

In a possible implementation, the processing unit 2301 is configured to send the frame through the candidate panel, where the candidate panel is one or more panels that meet the preset condition in the plurality of panels. The preset condition is detecting, through the panel, that a channel remains idle within the preset time period, and the preset time period is the time period before the time point at which the backoff count value backs off to zero.

In a possible implementation, the processing unit 2301 is further configured to: if the backoff count value is not zero and when detecting that the channel is idle in a current slot, subtract one from the backoff count value, and when detecting that the channel is busy in the current slot, suspend a backoff process of the first panel and retain a backoff count value and a contention window of the first panel. The first panel is a panel corresponding to the backoff count value in the plurality of panels.

Figure 24:
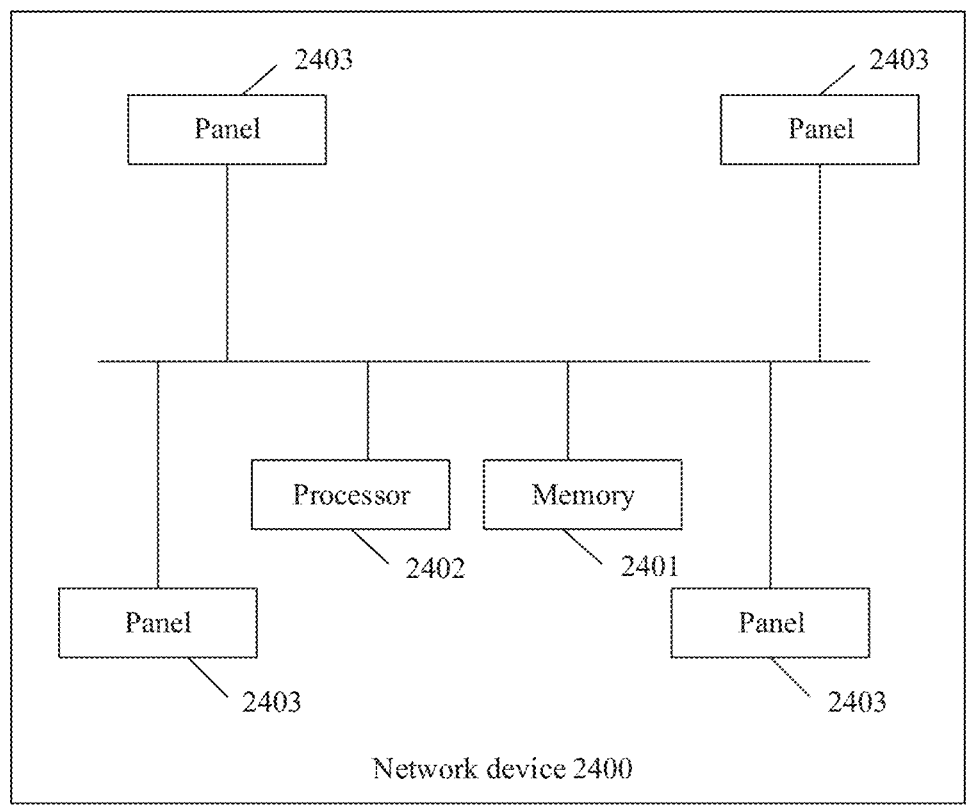
FIG. 24 is a schematic diagram of a structure of another network device according to an embodiment of this application.

FIG. 24 is a schematic diagram of a structure of another network device according to an embodiment of this application. A network device 2300 includes a memory 2401, a processor 2402, and a plurality of panels 2403, where the processor 2402 corresponds to the plurality of panels 2403. The memory 2401 is configured to store related instructions and data, and may transmit the stored data to the processor 2402.

The processor 2402 is configured to read the related instructions in the memory 2401, and perform the following operations:
generating a backoff count value; and
sending a frame through a panel if the backoff count value backs off to zero.

It can be learned that one backoff counter is set for the plurality of panels of the network device, and if the network device contends for permission to use a channel, one backoff process is maintained for the plurality of panels. If the backoff count value backs off to zero, it is determined that the network device obtains permission to use the channel. In this case, the network device may access the channel, so that the network device can successfully access the channel when sensing of channel states by the plurality of panels are different. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

It should be understood that, the processor 2402 mentioned in embodiments of this application may be a central processing unit (Central Processing Unit, CPU), or may be another general-purpose processor, a digital signal processor (Digital Signal Processor, DSP), an application-specific integrated circuit (Application Specific Integrated Circuit, ASIC), or a field programmable gate array (Field Programmable Gate Array, FPGA), or another programmable logic device, discrete gate, transistor logic device, discrete hardware component, or the like. The general-purpose processor may be a microprocessor, or the processor may further be any conventional processor, or the like.

The memory 2401 stores computer instructions and data. The memory 2401 may store computer instructions and data that are required for implementing the channel access method provided in this application. For example, the memory 2401 stores instructions used to implement steps of the channel access method. The memory 2401 may be any one or any combination of the following storage media a nonvolatile memory (for example, a read-only memory (ROM), a solid state drive (SSD), a hard disk (HDD), or a compact disc) and a volatile memory.

Specifically, the processor 2402 of the network device 2400 may be the processing unit 2301 of the network device 2300 in the embodiment shown in FIG. 23, and the panel of the network device 2400 may be the transceiver unit 2302 of the network device 2300 in the embodiment shown in FIG. 23.

Figure 25:
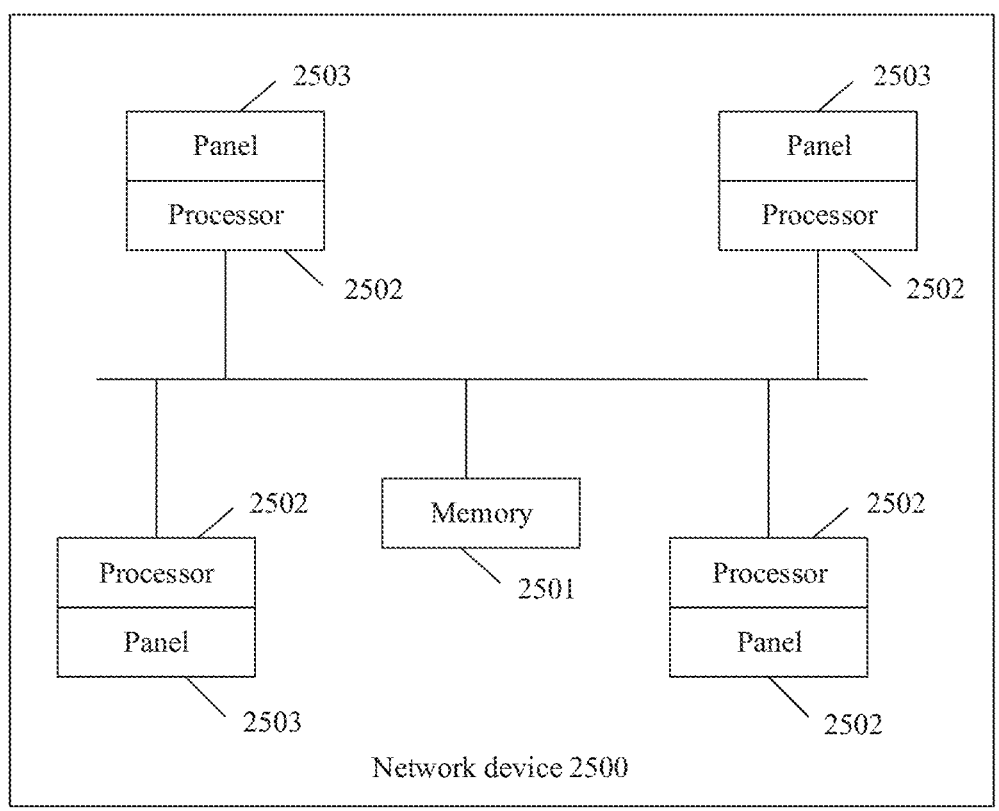
FIG. 25 is a schematic diagram of a structure of still another network device according to an embodiment of this application.

FIG. 25 is a schematic diagram of a structure of still another network device according to an embodiment of this application. A network device 2500 includes a memory 2501, a plurality of processors 2502, and a plurality of panels 2503, where each processor 2502 corresponds to one or more panels 2503 (FIG. 25 shows only a case in which each processor 2502 corresponds to one panel 2503). The memory 2501 is configured to store related instructions and data, and may transmit the stored data to the processor 2502.

The processor 2502 is configured to read the related instructions in the memory 2501, and perform the following operations:
generating a backoff count value; and
sending a frame through a panel if the backoff count value backs off to zero.

It can be learned that one backoff counter is set for the plurality of panels of the network device, and if the network device contends for permission to use a channel, one backoff process is maintained for the plurality of panels. If the backoff count value backs off to zero, it is determined that the network device obtains permission to use the channel. In this case, the network device may access the channel, so that the network device can successfully access the channel when sensing of channel states by the plurality of panels are different. Because a multi-panel device may be used to send a frame, a spatial flow is increased, a throughput during information transmission is improved, and information transmission efficiency is further improved. In addition, one backoff counter is set for the plurality of panels, and the network device maintains only one backoff process in the backoff process, thereby reducing complexity of the backoff process and reducing processing load of the network device.

It should be understood that, the processor 2502 mentioned in embodiments of this application may be a central processing unit (Central Processing Unit, CPU), or may be another general-purpose processor, a digital signal processor (Digital Signal Processor, DSP), an application-specific integrated circuit (Application Specific Integrated Circuit, ASIC), or a field programmable gate array (Field Programmable Gate Array, FPGA), or another programmable logic device, discrete gate, transistor logic device, discrete hardware component, or the like. The general-purpose processor may be a microprocessor, or the processor may further be any conventional processor, or the like.

The memory 2501 stores computer instructions and data. The memory 2501 may store computer instructions and data that are required for implementing the channel access method provided in this application. For example, the memory 2501 stores instructions used to implement steps of the channel access method. The memory 2201 may be any one or any combination of the following storage media a nonvolatile memory (for example, a read-only memory (ROM), a solid state drive (SSD), a hard disk (HDD), or a compact disc) and a volatile memory.

Specifically, the processor 2502 of the network device 2500 may be the processing unit 2301 of the network device 2300 in the embodiment shown in FIG. 23, and the panel 2503 of the network device 2500 may be the transceiver unit 2302 of the network device 2300 in the embodiment shown in FIG. 23.

It should be noted that FIG. 25 shows only a case in which one processor corresponds to one panel. In another case, in the network device 2500, one processor may correspond to a plurality of panels. For example, the plurality of processors included in the network device include at least one first processor and at least one second processor. One first processor corresponds to one panel, and one second processor corresponds to a plurality of panels. For another example, the network device includes a plurality of processors, and each of the plurality of processors corresponds to a plurality of panels.

This application provides a computer-readable storage medium. The computer-readable storage medium stores computer instructions, and the computer instructions instruct a server to perform the channel access method provided in any one of the foregoing implementations.

It should be further understood that "first", "second", "third", "fourth", and various numbers in this specification are merely used for differentiation for ease of description, and are not construed as a limitation to the scope of this application.

The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in various embodiments of this application. The execution sequences of the processes should be determined according to functions and internal logic of the processes, and should not be construed as any limitation on the implementation processes of embodiments of this application.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected depending on actual requirements to achieve the objectives of the solutions in the embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The computer software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

A sequence of the steps of the method in embodiments of this application may be adjusted, combined, or removed based on an actual requirement.

The modules in the apparatus in embodiments of this application may be combined, divided, and deleted based on an actual requirement.

In conclusion, the foregoing embodiments are merely intended for describing the technical solutions of this application, but not for limiting this application. Although this application is described in detail with reference to the foregoing embodiments, persons of ordinary skill in the art should understand that they may still make modifications to the technical solutions described in the foregoing embodiments or make equivalent replacements to some technical features thereof, without departing from the scope of the technical solutions of embodiments of this application.

What is claimed is:

1. A network device comprising:
at least one processor; and
a transceiver, wherein the transceiver comprises a plurality of panels,
wherein the at least one processor couple with at least one memory storing computer instructions for execution by the at least one processor that cause the network device to perform operations comprising:
generating a backoff count value of each of the plurality of panels; and
sending a frame in response to that a backoff count value of any one of the plurality of panels backs off to zero.

2. The device according to claim 1, wherein:
the sending a frame comprises:
sending a frame through a first panel, wherein the first panel is a panel whose backoff count value is zero in the plurality of panels; and
the operations comprise:
suspending a backoff process of each panel in all panels except the first panel in the plurality of panels; and
retaining a backoff count value and a contention window of each panel.

3. The device according to claim 1, wherein:
the sending a frame comprises:
sending a frame through a first panel, wherein the first panel is a panel whose backoff count value is zero in the plurality of panels; and
the operations comprise:
suspending a backoff process of each panel in all panels except the first panel in the plurality of panels;
resetting a backoff count value of each panel; and
retaining or resetting a contention window of each panel.

4. The device according to claim 1, wherein:
the sending a frame comprises:
sending a frame through at least one of a first panel or a candidate panel, wherein the first panel is a panel whose backoff count value is zero in the plurality of panels, and the candidate panel is one or more panels that meet a preset condition in all panels except the first panel in the plurality of panels, the preset condition is detecting, through a panel, that a channel remains idle within a preset time period, and the preset time period is a time period before a time point at which a backoff count value of the first panel backs off to zero; and
the operations comprise:
suspending a backoff process of each panel in all panels except the first panel in the plurality of panels; and retaining a backoff count value and a contention window of each panel; or
suspending a backoff process of each panel in all panels except the first panel and the candidate panel in the plurality of panels; and retaining a backoff count value and a contention window of each panel; or
the sending a frame comprises:
sending the frame through the first panel in response to that no panel meets the preset condition in all panels except the first panel in the plurality of panels; and
the operations comprise:
suspending a backoff process of each panel in all panels except the first panel in the plurality of panels; and retaining a backoff count value and a contention window of each panel.

5. The device according to claim 1, wherein:
the sending a frame comprises:
sending a frame through at least one of a first panel or a candidate panel, wherein the first panel is a panel whose backoff count value is zero in the plurality of panels, the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero; and
the operations comprise:
suspending a backoff process of each panel in all panels except the first panel in the plurality of panels; resetting a backoff count value of each panel; and retaining or resetting a contention window of each panel; or
suspending a backoff process of each panel in all panels except the first panel and the candidate panel in the plurality of panels, resetting the backoff count value and the contention window of each panel, and retain or reset the contention window of each panel; or
the sending a frame comprises:
sending the frame through the first panel in response to that no panel meets the preset condition in all panels except the first panel in the plurality of panels; and
the operations comprise:
suspending a backoff process of each panel in all panels except the first panel in the plurality of panels; resetting a backoff count value of each panel; and retaining or resetting a contention window of each panel.

6. The device according to claim 1, wherein the operations comprise:
in response to that the backoff count value of the any one of the plurality of panels is not zero, and
in response to detecting, through the panel, that a channel is idle in a current slot, subtract one from the backoff count value of the panel, and
in response to detecting, through the panel, that the channel is busy in the current slot, suspend a backoff process of the panel and retain a backoff count value and a contention window of the panel.

7. A network device, wherein the network device comprises at least one processor and a transceiver, the transceiver comprises a plurality of panels, and the at least one processor couple with at least one memory storing computer instructions for execution by the at least one processor that cause the network device to perform operations comprising:
generating a backoff count value; and
sending a frame in response to that the backoff count value backs off to zero.

8. The device according to claim 7, wherein the operations comprise:
before generating the backoff count value, detecting, through a first panel, whether a channel is idle, wherein the first panel is a panel corresponding to the backoff count value in the plurality of panels.

9. The device according to claim 8, wherein;
the sending a frame comprises:
send a frame through at least one of a first panel or a candidate panel, wherein the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero.

10. The device according to claim 7, wherein the operations comprise:
before generating the backoff count value, detecting a channel through each of the plurality of panels; and
determining, based on listening results of some or all of the plurality of panels, whether the channel is idle.

11. The device according to claim 10, wherein the operations comprise:
sending a frame through a candidate panel, wherein the candidate panel is one or more panels that meet a preset condition in the plurality of panels, the preset condition is detecting, through a panel, that a channel remains idle within a preset time period, and the preset time period is a time period before a time point at which the backoff count value backs off to zero.

12. The device according to claim 7, wherein the operations comprise:
in response to that the backoff count value is not zero, and
in response to detecting that a channel is idle in a current slot, subtract one from the backoff count value, or
in response to detecting that the channel is busy in the current slot, suspend a backoff process of a first panel and retain a backoff count value and a contention window of the first panel, wherein the first panel is a panel corresponding to the backoff count value in the plurality of panels.

13. A channel access method, applied to a network device, wherein the network device comprises a plurality of panels, and the method comprises:
generating a backoff count value for each of the plurality of panels; and
sending a frame in response to that a backoff count value of any one of the plurality of panels backs off to zero.

14. The method according to claim 13, wherein:
the sending a frame comprises:
sending a frame through a first panel, wherein the first panel is a panel whose backoff count value is zero in the plurality of panels; and
the method further comprises:
suspending a backoff process of each panel in all panels except the first panel in the plurality of panels, and retaining a backoff count value and a contention window of each panel.

15. The method according to claim 13, wherein:
the sending a frame comprises:
sending a frame through a first panel, wherein the first panel is a panel whose backoff count value is zero in the plurality of panels; and
the method further comprises:
suspending a backoff process of each panel in all panels except the first panel in the plurality of panels; resetting a backoff count value of each panel; and retaining or resetting a contention window of each panel.

16. The method according to claim 13, wherein:
the sending a frame comprises:
sending a frame through at least one of a first panel or a candidate panel, wherein the first panel is a panel whose backoff count value is zero in the plurality of panels, the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero;
the method further comprises:
in response to that the frame is sent through the first panel, suspending a backoff process of each panel in all panels except the first panel in the plurality of panels; and retaining a backoff count value and a contention window of each panel; and
in response to that the frame is sent through the first panel and the candidate panel, or the frame is sent through the candidate panel, suspending a backoff process of each panel in all panels except the first panel and the candidate panel in the plurality of panels; and retaining a backoff count value and the contention window of each panel.

17. The method according to claim 13, wherein;
the sending a frame comprises:
sending a frame through at least one of a first panel or a candidate panel, wherein the first panel is a panel whose backoff count value is zero in the plurality of panels, the candidate panel is one or more panels that meet a preset condition in all panels except the first panel in the plurality of panels, the preset condition is detecting, through a panel, that a channel remains idle within a preset time period, and the preset time period is a time period before a time point at which the backoff count value of the first panel backs off to zero;
the method further comprises:
in response to that the frame is sent through the first panel, suspending a backoff process of each panel in all panels except the first panel in the plurality of panels, resetting a backoff count value of each panel, and retaining or resetting a contention window of each panel; and
in response to that the frame is sent through the first panel and the candidate panel, or the frame is sent through the candidate panel, suspending a backoff process of each panel in all panels except the first panel and the candidate panel in the plurality of panels; resetting the backoff count value of each panel; and retaining or resetting the contention window of each panel.

18. The method according to claim 13, wherein the method further comprises:
in response to that the backoff count value of the any one of the plurality of panels is not zero, and
in response to detecting, through the panel, that a channel is idle in a current slot, subtracting one from the backoff count value of the panel; and
in response to detecting, through the panel, that the channel is busy in the current slot, suspending a backoff process of the panel and retaining a backoff count value and a contention window of the panel.

19. The method according to claim 13, wherein:
the sending a frame comprises:
sending the frame through a first panel in response to that no panel meets a preset condition in all panels except the first panel in the plurality of panels; and
the method further comprises:
suspending a backoff process of each panel in all panels except the first panel in the plurality of panels, and retaining the backoff count value and a contention window of each panel.

20. The method according to claim 13, wherein:
the sending a frame comprises:
sending the frame through a first panel in response to that no panel meets a preset condition in all panels except the first panel in the plurality of panels; and
the method further comprises:
suspending a backoff process of each panel in all panels except the first panel in the plurality of panels, resetting a backoff count value of each panel; and retaining or resetting a contention window of each panel.

* * * * *

UNITED STATES PATENT AND TRADEMARK OFFICE
CERTIFICATE OF CORRECTION

| | | |
|---|---|---|
| PATENT NO. | : 12,267,866 B2 | Page 1 of 1 |
| APPLICATION NO. | : 17/860982 | |
| DATED | : April 1, 2025 | |
| INVENTOR(S) | : Mao Yang, Zhongjiang Yan and Jian Yu | |

It is certified that error appears in the above-identified patent and that said Letters Patent is hereby corrected as shown below:

On the Title Page

In Column 2 (item (56) Other Publications), In Line 6, Delete "EEE" and insert -- IEEE --.

In the Claims

In Column 38, In Line 24, In Claim 9, delete "wherein;" and insert -- wherein: --.

In Column 39, In Line 46 (Approx.), In Claim 17, delete "wherein;" and insert -- wherein: --.

Signed and Sealed this
Twenty-second Day of July, 2025

Coke Morgan Stewart
*Acting Director of the United States Patent and Trademark Office*